(12) United States Patent
Takada et al.

(10) Patent No.: US 7,920,178 B2
(45) Date of Patent: Apr. 5, 2011

(54) IMAGE STORAGE SYSTEM

(75) Inventors: Tomomi Takada, Kodaira (JP); Seiichi Hirai, Koshigaya (JP); Shinya Ogura, Higashikurume (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 598 days.

(21) Appl. No.: 11/681,892

(22) Filed: Mar. 5, 2007

(65) Prior Publication Data

US 2007/0226768 A1 Sep. 27, 2007

(30) Foreign Application Priority Data

Mar. 22, 2006 (JP) ................................. 2006-078345

(51) Int. Cl.
*H04N 5/76* (2006.01)
(52) U.S. Cl. .................... 348/231.99; 725/105; 348/143; 348/211.11
(58) Field of Classification Search ............. 348/231.99, 348/143; 725/105
See application file for complete search history.

(56) References Cited

U.S. PATENT DOCUMENTS

| | | | | |
|---|---|---|---|---|
| 4,866,543 A * | 9/1989 | Cooper et al. | ................... | 360/15 |
| 5,899,575 A * | 5/1999 | Okayama et al. | ............... | 386/46 |
| 5,996,014 A | 11/1999 | Uchihori et al. | | |
| 2002/0042817 A1 | 4/2002 | Lahr | | |
| 2002/0078172 A1 * | 6/2002 | Yoshikai et al. | ............... | 709/218 |
| 2002/0141732 A1 | 10/2002 | Reese et al. | | |
| 2004/0244055 A1 | 12/2004 | Takada | | |
| 2005/0076176 A1 | 4/2005 | Takada | | |
| 2005/0102704 A1 | 5/2005 | Prokupets et al. | | |
| 2005/0117176 A1 * | 6/2005 | Benz et al. | .................... | 358/1.15 |
| 2005/0246748 A1 * | 11/2005 | Muroi et al. | .................... | 725/90 |
| 2005/0283521 A1 * | 12/2005 | Whan | ........................... | 709/208 |
| 2006/0184553 A1 * | 8/2006 | Liu et al. | ....................... | 707/101 |

FOREIGN PATENT DOCUMENTS

| | | |
|---|---|---|
| EP | 1311122 A3 | 6/2003 |
| JP | 10271447 | 10/1998 |
| JP | 2001346181 | 12/2001 |
| JP | 2001346181 A * | 12/2001 |
| JP | 2002369141 | 12/2002 |
| JP | 2002369141 A * | 12/2002 |
| JP | 2004103105 | 4/2004 |
| JP | 2004-355724 | 12/2004 |
| JP | 2005-092679 | 4/2005 |
| WO | 03001809 | 1/2003 |

\* cited by examiner

*Primary Examiner* — Jason Chan
*Assistant Examiner* — Cynthia Calderon
(74) *Attorney, Agent, or Firm* — Brundidge & Stanger, P.C.

(57) ABSTRACT

An image storage system effectively stores image data captured by an image capture device in a plurality of image storage devices. Each of the image storage devices includes a storage unit for storing image data. An image storage device performing as a master among the image storage devices includes an image reception unit for receiving the image data captured by the image capture device. A storage unit provided in each of the image storage devices distributes the image data received by the image reception unit provided in the image storage device performing as the master to the respective image storage devices so as to be stored there.

9 Claims, 20 Drawing Sheets

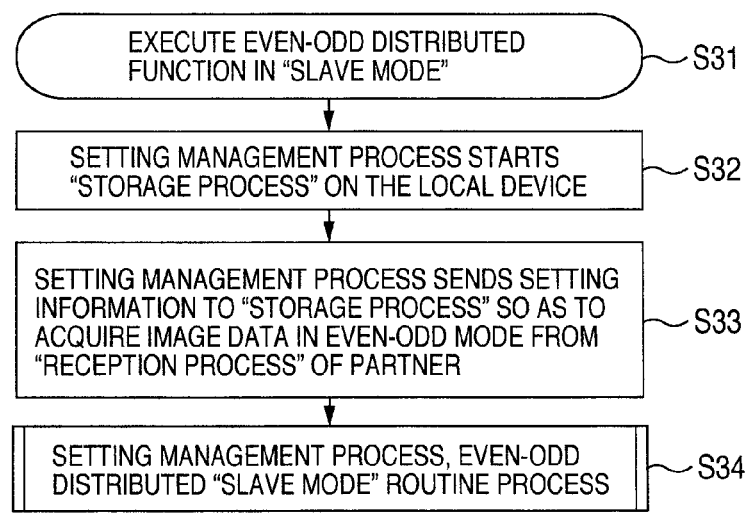
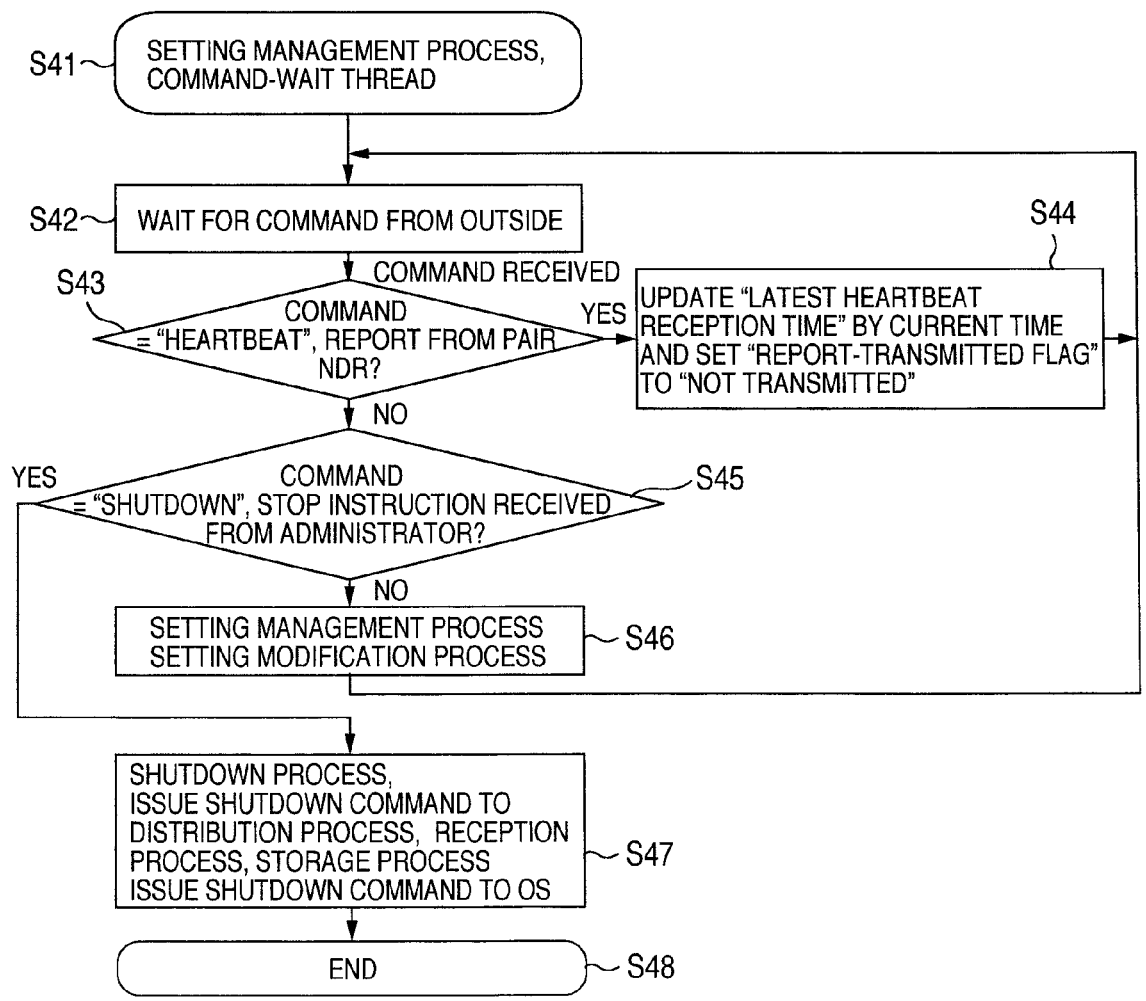

FIG.21

EVEN-ODD DISTRIBUTED RECORDING
SCHEDULE SETTING SCREEN — 151

153 — CAMERA NUMBER  1 ▽ — 154

| | SUN | MON | TUE | WED | THUR | FRI | SAT — 155 |
|---|---|---|---|---|---|---|---|
| 00:00 | | | | | | | |
| 02:00 | | | | | | | |
| 04:00 | | | | | | | |
| 06:00 | 7:00 ~17:30 5fps | 7:00 ~17:30 5fps | 7:00 ~17:30 5fps | 7:00 ~17:30 5fps | 7:00 ~17:30 5fps | 7:00 ~17:30 5fps | 7:00 ~12:30 1fps |
| 08:00 | | | | | | | |
| 10:00 | | | | | | | |
| 12:00 | | | | | | | |
| 14:00 | | | | | | | |
| 16:00 | | | | | | | |
| 18:00 | | | | | | | |
| 20:00 | | | | | | | |
| 22:00 | | | | | | | |

---SCHEDULE ADDITION---
DAY OF THE WEEK [EVERY DAY ▽]  START TIME [00:00 ▽]  END TIME [00:00 ▽]  RATE [5 ▽]  [ADD]
                162                163                 164                165         166
161                                                                                          152 — [Close]

IMAGE STORAGE SYSTEM

INCORPORATION BY REFERENCE

The present application claims priority from Japanese application JP 2006-078345 filed on Mar. 22, 2006, the content of which is hereby incorporated by reference into this application.

BACKGROUND OF THE INVENTION

The present invention relates to an image storage system for storing image data such as a system using a network digital recorder (NDR) which is a device for acquiring, storing, and distributing image data via a network.

For example, a study is made on an image storage system for capturing an image of a predetermined region by a camera for monitoring, storing data on the captured image in an image storage device such as an NDR, and displaying the stored image data on a screen provided on a client such as a computer.

FIG. 25 shows a configuration example of an image storage system. It should be noted that like components substantially identical to those shown in FIG. 1 relating to the present invention which will be described later are denoted by like symbols (like symbols excluding A and B). However, this does not have an intention to limit the present invention.

A network 2 is a computer network for connecting a plurality of computers for communicating a control signal and a signal such as data.

A plurality (m pieces) of IP cameras (Internet Protocol Cameras) 3 (3-1 to 3-m) are provided for outputting captured image data to the network 2.

A plurality (n pieces) of client PC (Personal Computers) 4 (4-1 to 4-n) are provided as ordinary personal computers having a Web browser by network connection.

A network digital recorder (NDR) 1 is connected via the network 2 to the IP cameras (3-1 to 3-m) and a plurality of client PC 4 (4-1 to 4-n) for performing view of the image data and setting of the NDR 1.

The NDR 1 includes a computer board 12 and a recording device 11 as components.

On the computer board 12, there are arranged a network interface (network I/F) 14, a recording device interface (recording device I/F) 15, a memory 16, and a CPU (Central Processing Unit) 17 which are connected via a control bus 13.

In the recording device 11, there are provided recording regions 31 (31-1 to 31-m) for the respective cameras and a setting information file 19. The number of the camera recording regions 31 (31-1 to 31-m) is identical to the number of the IP cameras 3 (3-1 to 3-m) for recording. The regions 31 are used for recording image data from the IP cameras (3-1 to 3-m).

When the contents of the setting information file 19 are read into the memory 16, the contents become setting information 18. In this case, the contents of the setting information file 19 are identical to the contents of the setting information 18.

The setting information 18 includes a administrator's password 521 and per-camera information 522.

The per-camera information 522 includes a camera name 531, a camera type 532, an address (URL or IP address) 533, a camera administrator's password 534, a schedule 535, and a recording region size (byte size) 536.

FIG. 26 shows an example of process configuration of software for acquiring, storing, and distributing image data on the NDR 1 and explains operation states of the software. It should be noted that like components substantially identical to those shown in FIG. 2 relating to the present invention which will be described later are denoted by like symbols (or like symbols excluding A and B). However, this does not have an intention to limit the present invention.

A process 21 concerning image data acquisition, storage, and distribution includes a storage process 22, a setting management process 23, a reception process 24 (24-1 to 24-m), and a distribution process 25.

The storage process 22 is a process for performing read/write from/to the recording device 11 and manages which position on the recording device 11 is used as the recording region 31 (31-1 to 31-m) of a particular camera. The storage process 22 performs write of image data into the camera recording regions 31 (31-1 to 31-m) and read of image data from the camera recording regions 31 (31-1 to 31-m).

The setting management process 23 performs instructions of start, end, setting modification of processes concerning image capture, storage, and distribution and manages the processes according to the setting information 18.

The reception process 24 consists of m processes (24-1 to 24-m) for acquiring image data from the IP cameras 3 (3-1 to 3-m). According to a protocol of the IP cameras 3 (3-1 to 3-m), a request for image data is made, image data is received from the IP cameras 3 (3-1 to 3-m), and image data is transmitted to the storage process 22. In this example, one reception process 24 (24-1 to 24-m) is allocated for one IP camera (3-1 to 3-m).

The distribution process 25 is a process for distributing image data to the client PC 4 (4-1 to 4-n), i.e., receiving an image data request from the client PC 4 (4-1 to 4-n, reading out image data from the recording device 11 via the storage process 22, and transmitting the image data to the client PC (4-1 to 4-n).

According to a flow of the image data, an explanation will be given on an example of operation performed in an image storage system shown in FIG. 25.

Firstly, the operation at the image recording side will be explained.

The IP camera 3 (3-1 to 3-m) compresses captured images for each frame by using an image compression method such as the JPEG (Joint Photographic Experts Group) and transmit them in the IP packet format toward the NDR 1 in the network 2.

The image data transmitted from the IP camera 3 (3-1 to 3-m) is transmitted in the IP format through the network 2 to reach the network I/F 14.

The network I/F 14 converts the received image data in the IP format into a format to be transmitted to the control bus 13 and passes the image data to the reception process 24 (24-1 to 24-m) of the software operating on the CPU 17.

The reception process 24 (24-1 to 24-m) removes a character string for communication from the image data, adds the current time information to the image data, and transmits the image data to the storage process 22.

The storage process 22 temporarily stores the received image data in the memory 16. After accumulating 10 to 100 data pieces, the storage process 22 calculates the storage position on the recording device 11 and stores the accumulated image data via the recording device I/F in the camera recording region 31 (31-1 to 31-m) of the recording device 11.

Here, the image data from the IP camera 3-1 is stored in the camera recording region 31-1, the image data from the IP camera 3-m is stored in the camera recording region 31-m. Thus, the image data from each of the IP cameras 3 (3-1 to 3-m) is stored in the corresponding camera recording region 31 (31-1 to 31-m).

The memory 16 of the NDR 1 in recording operation contains the setting information 18 required for recording operation.

The administrator's password 521 is a password for identifying a setting modification authorized person of the NDR 1.

The per-camera information 522 has various information pieces 531 to 536 existing in the camera performing recording.

The camera name 531 is a character string assigned as a name which can be easily identified by an administrator.

The camera type 532 is a name for identifying a camera type. For example, the communication method may vary depending on the camera type. The camera type 532 is information for deciding the communication method used for acquiring image data.

The address 533 is information required by the NDR 1 to make a connection via the network 2 to the IP camera 3 (3-1 to 3-m). For example, the address 533 is an URL (Uniform Resource Locator) or an IP address of the IP camera 3 (3-1 to 3-m).

The camera administrator's password 534 is a password which is transmitted when modifying the setting of the IP camera 3 (3-1 to 3-m) from the NDR 1. For example, depending on the recording process, the setting of the IP camera 3 (3-1 to 3-m) should be modified. The camera administrator's password 534 is used when a password is required for authenticating the administrator when modifying the setting of the IP camera 3 (3-1 to 3-m).

The schedule 535 is table information indicating when imaging is performed with how many frames. For example, in the NDR 1, it is possible to perform processing by changing the frame rate between the day time and the night time.

The recording region size 536 is a byte size of the camera recording region 31 (31-1 to 31-m) allocated for the corresponding IP camera 3 (3-1 to 3-m) on the recording device 11.

Next, explanation will be given on the operation at the image distribution side.

A user who wants to view an image recorded in the NDR 1 operates the NDR reproduction software on the client PC 4 (4-1 to 4-n). Then, in the client PC 4 (4-1 to 4-n), the NDR reproduction software acquires image data from the NDR 1 and performs image display and reproduction on the screen of the client PC 4 (4-1 to 4-n).

More specifically, the NDR reproduction software on the client PC 4 (4-1 to 4-n) transmits an image distribution request in the IP format to the NDR 1 via the network 2. The image distribution request transmitted from the client PC 4 (4-1 to 4-n) is transmitted in the IP format through the network 2 to reach the network I/F 14 of the NDR 1.

The network I/F 14 converts the received image distribution request in the IP format into a format to be transmitted to the control bus 13 and transmits it to the distribution process 25 of the software operating on the CPU 17. According to the image distribution request, the distribution process 25 requests the storage process 22 to read out image data. According to the image distribution request, the storage process 22 reads out image data from the camera recording region 31 (31-1 to 31-m) via the recording device 11 and transmits it to the distribution process 25. The distribution process 25 transmits image data in the IP format from the network I/F 14 via the network 2 to the client PC 4 (4-1 to 4-n).

The NDR reproduction software on the client PC 4 (4-1 to 4-n) decodes the received image data and displays it on the screen.

Here, the camera recording region 31 (31-1 to 31-m) is created by the administrator of the NDR 1 by using the setting screen for region allocation from the client PC 4 (4-1 to 4-n).

Moreover, the administrator of the NDR 1 decides the byte size of the camera recording region 31 (31-1 to 31-m) considering the frame rate upon recording and the recording time for the IP camera 3 (3-1 to 3-m) to be connected.

FIG. 27 shows an example of recording state in the camera recording region 31-1 in the NDR 1. It should be noted that like components substantially identical to those shown in FIG. 2 relating to the present invention which will be detailed later are denoted by like symbols (or like symbols excluding A and B). However, this does not have an intention to limit the present invention.

As shown in FIG. 27, when recording image data into the camera recording region 31-1, recording is started at the head of the region and when recording reaches the end of the region, overwrite is started at the head of the region. Thus, cyclic recording is performed in an allocated region in advance without automatically extending the capacity.

Moreover, a management number (a serial number starting from 1 independent for each camera) is attached to the acquired image data of each frame. In this example, this will be called "a frame number". When recording image data in the recording device 11, an image acquisition time and a frame number are also recorded.

When acquiring one frame of image data from the client PC 4 (4-1 to 4-n), target image data can be acquired by specifying a time or a frame number.

Moreover, the NDR 1 has a variety of setting items.

For example, there are settings of an address (an IP address or a domain name) of the NDR 1, address of the respective cameras 3 (3-1 to 3-m) for capturing an image, a schedule of a frame rate in the image capturing by each of the cameras 3 (3-1 to 3-m), a region size of the camera recording region 31 (31-1 to 31-m), and the like.

These settings are performed via the setting screen displayed on the Web browser of the client PC 4 (4-1 to 4-n) via the network 2.

It should be noted that it is possible to configure the system in such a way that any one can modify the settings or in such a way that only a administrator can modify the settings by using the password 521 set for the administrator.

Similarly, it is possible to set a password for modify setting of the camera 3 (3-1 to 3-m).

These techniques are detailed, for example, in JP-A-2005-92679 (US 2005/076176) and JP-A-2004-355724 (US 2004/244055).

SUMMARY OF THE INVENTION

When two NDR 1 are prepared, it is possible to improve reliability of the operation or to extend the recording time. In this example, the former will be called "a parallel connection" and the latter will be called "a series connection".

In the parallel connection, two NDR 1 records the same image. Even when one of the NDR 1 is in a stop state, the other NDR 1 can continue recording. Accordingly, it is possible to obtain a higher reliability than when using one NDR 1.

In the series connection, the first NDR 1 and the second NDR 1 have different roles. The first NDR 1 acquires image data from the IP camera 3 (3-1 to 3-m) and holds new image data while the second NDR 1 acquires and holds image data immediately before overwritten in the first NDR 1. Thus, it is possible to perform recording for a longer time than when only one NDR 1 is used.

However, there is also such an opinion that although the parallel connection is effective as a countermeasure for the failure of one NDR 1, the failure time is not long and recording of the same image data by two NDR 1 all the time is inefficient because the recording time obtained is only for one NDR 1 in spite of that two NDR 1 are present.

On the other hand, in the series connection, if one of the NDR 1 fails, the other NDR 1 cannot continue the processing, which causes a significant problem in viewing and recording. In viewing (reproduction), the image of the NDR 1 which has failed cannot be viewed and the time when an image cannot be viewed has a great deviation. During recording, if one NDR 1 fails, recording from the IP camera (3-1 to 3-m) cannot be performed and image data during the failure of the first NDR 1 lacks. Moreover, when the second NDR 1 fails, the first NDR 1 performs overwrite before passing the image data to the second NDR 1 and the image data not passed lacks.

Accordingly, it is desired to develop a method having the advantages of the parallel connection and the series connection and compensate their disadvantages. That is, a desired method to be developed has a longer recording time and a higher reliability than when one NDR 1 is operated.

It is therefore an object of the present invention to provide an image storage system capable of effectively storing image data.

In order to achieve the aforementioned object, the image storage system according to the present invention stores image data captured by an image capture device by a plurality of image storage devices by using a configuration as follows.

That is, each of the image storage devices has a storage unit for storing image data. Moreover, among the image storage devices, one which performs as a master has an image reception unit for receiving image data captured by the image capture device. Image data received by the image reception unit provided in the image storage device performing as the master is distributed to each of the image storage devices and stored in the storage unit provided in each of the image storage devices.

Accordingly, among the image storage devices, an image storage device performing as the master receives image data captured by the image capture device and distributes the image data to an image storage device performing as the master and/or an image storage device performing as a slave so that the image data is stored in the storage unit of the image storage device to which the image data has been distributed. Thus, by using the relationship of the master and the slave, it is possible to effectively store the image data.

Here, various types may be used as the image capture device. For example, it is possible to use a camera for capturing an image or a WEB encoder for inputting an image.

Moreover, various types may be used as the image storage device. For example, it is possible to use a network digital recorder (NDR).

Moreover, various numbers of video storage devices may be used such as two or three or more.

Normally, when two image storage devices are used, one of them performs as a master and the other performs as a slave. Moreover, when three or more image storage devices are used, one of them performs as a master and the others perform as slaves. Moreover, for example, among a plurality of image storage devices, the image storage device having the old start time may be a master.

Moreover, various methods may be used for distributing image data to a plurality of image storage devices and storing the data in them. For example, a predetermined set such as one frame of image data may be stored successively in the respective image storage devices.

In the image storage system according to the present invention, for example, a configuration as follows may be used.

That is, the image storage devices have a check unit for checking whether the other image storage devices are normally operating. Each of the image storage devices operates in a mode based on the check result obtained by the check unit.

Accordingly, by checking whether each of the image storage devices is normally operating so that each of the image storage devices operates in a mode based on the check result, it is possible to operate in an appropriate mode according to the operation enabled/disabled state of the image storage devices.

Here, the check unit is provided, for example, in each of the image storage devices.

Moreover, information relating to the check result obtained by the check unit may be outputted to a user by a report unit.

Moreover, the method for checking whether the other image storage devices are normally operating may be such that, for example, when communication with another image storage device is normally operating, it is judged that the another image storage device is normally operating and when the communication with the another image storage device has failed, it is judged that the another image storage device has failed.

Moreover, various types may be used as the operation mode such as a master mode for operating as a master and a slave mode for operating as a slave. It is also possible to use a degraded master mode for storing all the image data in only one image storage device.

In the image storage system according to the present invention, for example, a configuration as follows may be used.

That is, when it is judged that one or more of the image storage devices have failed according to the check result obtained by the check unit, the storage unit provided in the remaining image storage devices store all the image data captured by the image capture device by the remaining image storage devices.

Accordingly, when image data is distributed to be stored in a plurality of image storage devices, even if some of the image storage devices stop operation due to a trouble or the like, the mode is switched so that the remaining image storage devices store all the image data. Thus, it is possible to effectively store the image data.

In the image storage system according to the present invention, for example, a configuration as follows may be used.

That is, the image storage device performing as the master includes an image output unit for acquiring image data stored in the storage unit provided in the image storage devices and arrange the data in the chronological order for output.

Accordingly, a series of image data distributed and stored in the image storage devices can be arranged in the chronological order for output.

Here, the method for arranging the distributed image data in the chronological order may be, for example, a method for sorting a plurality of frames constituting a series of image data into a chronological order.

Moreover, various this may be used as the destination to which the image data is outputted. For example, it is possible to use a method for displaying/outputting the data on a monitor screen of the image display device or a method for transmitting/outputting to a computer as a client. Moreover, it is also possible to use a method for selecting image data requested by the client and outputting the image data.

In the image storage system according to the present invention, for example, a configuration as follows may be used.

That is, the image capture device includes a compression unit for compressing the picked image data of a predetermined number of frames of odd numbers and compressing the picked image data of a predetermined number of frames of even numbers by the compression method for compressing image data for each set of a plurality of frames. The storage unit provided in each of the image storage devices distributes and stores the compressed image data for each set of the predetermined number of frames as a unit into the respective image storage devices.

Accordingly, when using the compression method for compressing each set of a plurality of frames of image data, odd-number frames and even-number frames constituting the image data are compressed as different sets and the continuous odd-number frames and the even-number frames are stored in the different image storage devices. Accordingly, as compared to the case when a set of a predetermined number of continuous frames is compressed and stored, it is possible to reduce the disconnected state of a series of data even when one of the image storage devices has failed and output image data which can easily be viewed.

Here, the compression method for compressing image data for each set of a plurality of frames is not limited to a particular one. For example, it is possible to use the MPEG (Moving Pictures Expert Group) method. It should be noted that as a method for performing compression for each frame, it is possible to use, for example, JPEG (Joint Photographic Experts Group).

Moreover, the predetermined number of frames as a unit of compression is not limited to a particular one. For example, it is possible to use a compression unit as follows: (first, third, fifth frame), (second, fourth, sixth frame), (seventh, ninth, eleventh frame), (eighth, tenth, twelfth frame), and so on.

It should be noted that the present invention may also be provided as a method, a program, and a recording medium.

In the method of the present invention, in the respective devices, respective units performs various processes.

In the program of the present invention, a computer constituting the respective devices executes the program and realizes various functions.

In the recording medium of the present invention, the program to be executed by the computer constituting the respective devices is recorded in such a manner that the program can be read by an input unit of the computer. The program causes the computer to execute various processes.

As has been described above, in the image storage system according to the present invention, it is possible to effectively store image data when storing image data captured by an image capture device in a plurality of image storage devices.

Other objects, features and advantages of the invention will become apparent from the following description of the embodiments of the invention taken in conjunction with the accompanying drawings.

BRIEF DESCRIPTION OF THE DRAWINGS

FIG. 6 shows an example of flow of processes performed in the slave mode.

FIG. 7 shows an example of flow of processes performed by a command-wait thread of the setting management process.

FIG. 21 shows an example of a schedule setting screen of even-odd distributed recording.

DETAILED DESCRIPTION OF EMBODIMENTS

Description will now be directed to embodiments of the present invention with reference to the attached drawings.

Figure 1:
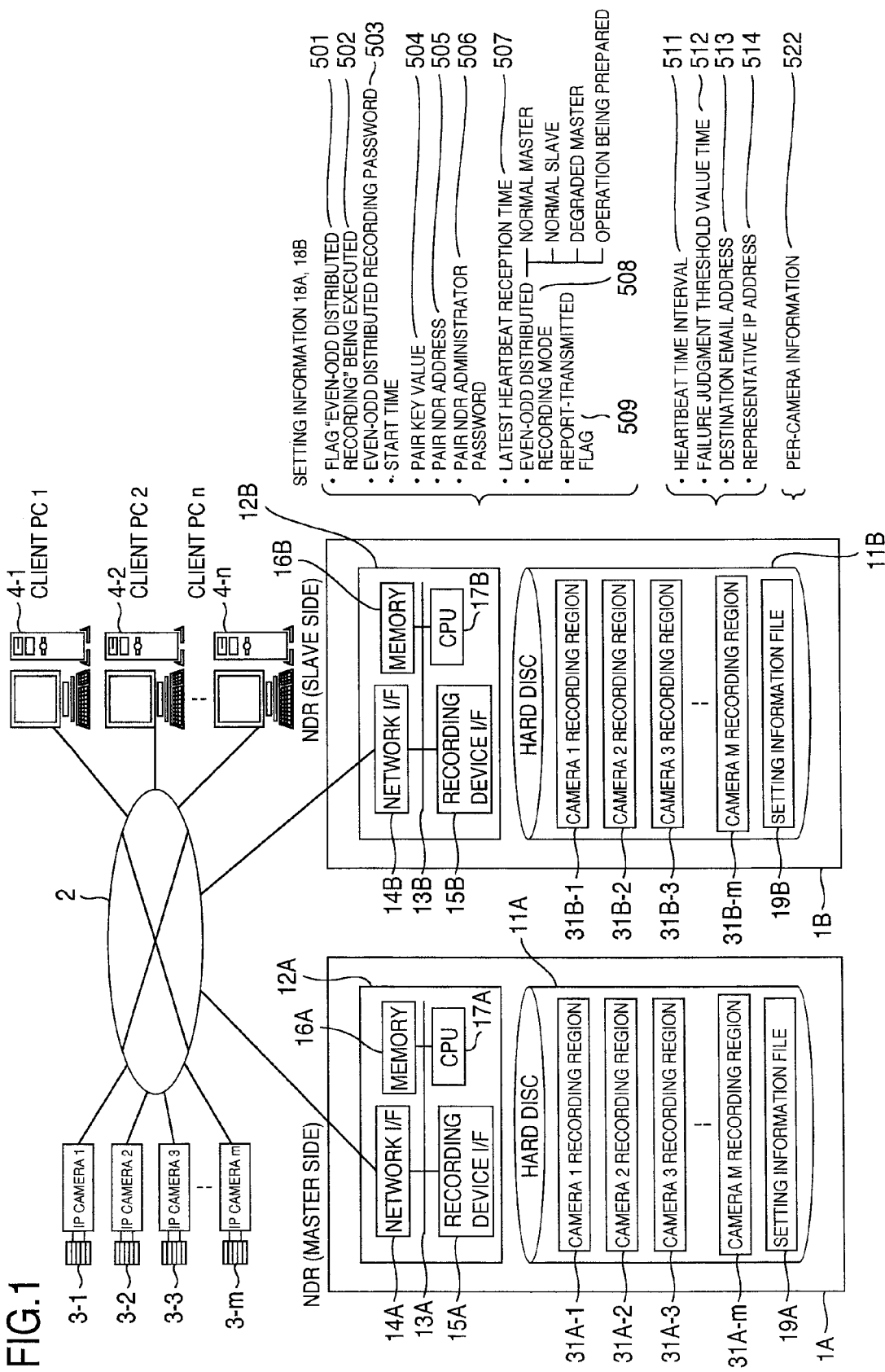
FIG. 1 shows a configuration example of an image storage system according to an embodiment of the present invention.

FIG. 1 shows a configuration example of an image storage system according to an embodiment of the present invention.

In the image storage system of the present embodiment, two network digital recorders (NDR) 1A, 1B are connected to m pieces of IP cameras 3 (3-1 to 3-m) and n pieces of client PC 4 (4-1 to 4-n) via a network 2.

Each of the NDR 1A, 1B includes a computer board 12A, 12B and a recording device 11A, 11B as a hard disc.

On the computer board 12A, 12B, a network interface (network I/F) 14A, 14B, a recording device interface (recording device I/F) 15A, 15B, a memory 16A, 16B, and a CPU 17A, 17B are arranged and these are connected via a control bus 13A, 13B.

The recording device 11A, 11B stores the camera recording regions 31A (31A-1 to 31A-m), 31B (31B-1 to 31B-m) corresponding to the respective IP cameras 3 (3-1 to 3-m) and a setting information file 19A, 19B. When the contents of the setting information file 19A, 19B are read into the memory 16A, 16B, they become setting information 18A, 18B.

In the image storage system of this embodiment, image data is recorded in a frame unit alternately in the two NDR 1A, 1B. Moreover, when one of the NDR stops operation, the other operating NDR records all the frames. After the NDR which has stopped operation is recovered, the state that the two NDR 1A, 1B alternately record image data in a frame unit is recovered.

In the present embodiment, image data is recorded in a frame unit alternately in the two NDR 1A, 1B. When one of the NDR stops, view can be performed at the state that the frame rate is lowered to half. Accordingly, no significant lack is caused.

Moreover, when one of the NDR has stopped, the other operating NDR records all the frames and no lack of image data is caused.

Consequently, it is possible to realize a recording time equivalent to the serial connection during a normal state, and even during a degraded state when one of the NDR is not operating, it is possible to view an image at a frame rate lowered to half and continuously record all the frames, thereby obtaining reliability equivalent to the parallel connection.

Thus, the image recording method in the image storage system according to the present embodiment has the advantages of the both of the parallel connection and the serial connection while compensating the disadvantage of the parallel and the serial connection. In this embodiment, such a method will be called "an even-odd distributed record method".

In the image storage system of the present embodiment, two NDR 1A and 1B are arranged. In this embodiment, the NDR having a priority in the setting management is called "a master mode" and the NDR having no priority and receiving an operation instruction from the other NDR is called "a slave mode".

This embodiment assumes that the NDR 1A is operating in the master mode and the NDR 1B is operating in the slave mode.

The even-odd distributed recording method of the present embodiment is realized by the two NDR 1A and 1B. It is possible to separately set the two NDR 1A, 1B from outside. However, the present embodiment also has such a mechanism that two NDR 1A and 1B are shown virtually as a single NDR from outside.

The memories 16A, 16B of the two NDR 1A, 1B contain information 501 to 509, and 511 to 514 (setting information 18A, 18B) required for the even-odd distributed recording.

A flag 501 of execution of "the even-odd distributed recording" indicates whether the process of the even-odd distributed recording is being executed. When this flag is ON, the even-odd distributed recording is being executed.

An even-odd distributed recording password 502 is an administrator's password used when handling the two NDR 1A and 1B constituting a pair by the even-odd distributed recording as a single NDR viewed from outside. The even-odd distributed recording password 502 is different from the password 521 for setting management of a single NDR.

A start time 503 indicates the start time of the NDR 1A, 1B, i.e., the time when power of the NDR 1A, 1B is turned ON and the setting management process 23A, 23B starts operation.

The start time 503 is changed each time power of the NDR 1A, 1B is turned ON and the setting management process 23A, 23B is re-started.

A pair key value 504 is information required for checking whether a pair is formed in the even-odd distributed recording and used when searching for a partner of the pair.

A pair NDR address 505 is the address of the NDR 1A, 1B constituting a pair in the even-odd distributed recording such as an URL or an IP address.

A pair NDR administrator's password 506 is a password for setting management of the NDR 1A, 1B constituting a pair in the even-odd distributed recording.

A latest heartbeat reception time 507 indicates the time when the latest heartbeat is received. In the even-odd distributed recording method of the present embodiment, a heartbeat communication for confirming the normal operation is performed periodically with the NDR 1A, 1B constituting a pair.

An even-odd distributed recording operation mode 508 indicates operation states in the even-odd distributed recording operation, i.e., following four states, in this embodiment: "normal master", "normal slave", "degraded master", and "operation in preparation".

In this embodiment, when the two even-odd distributed NDR 1A, 1B are normally operating, the state of the side operating in the master mode is called "normal master" and the state of the side operating in the slave mode is called "normal slave". Moreover, when one of the two even-odd distributed NDR 1A, 1B has stopped operation and the other NDR is recording both of even-numbered and odd-numbered frames in the degraded operation, the state of the side operating in the degraded state is called "degraded master" and the state of the side which has stopped operation is called "operation in preparation".

A report-transmitted flag 509 indicates whether a report has been made to outside when one of the NDR 1A, 1B in the even-odd distributed recording has failed and the mode is changed to the degraded mode.

A heartbeat time interval 511 is a time interval of heartbeats performed by the NDR 1A, 1B constituting a pair of the even-odd distributed recording for confirming the normal operation.

An abnormality judgment threshold time 512 indicates a time as a threshold for judging whether abnormality is present. If no heartbeat communication is performed from the NDR 1A, 1B as a partner of the pair of the even-odd distributed recording, it is judged that the NDR 1A, 1B of the partner is in an abnormal state.

A destination email address 513 is specified in advance and when abnormality is detected, a message that an abnormal state has occurred is reported to this address.

A representative IP address 514 holds an IP address representing the two NDR 1A, 1B performing the even-odd distributed recording operation when virtually showing them as a single NDR from outside. The representative IP address 514 is an IP address different from the NDR 1A and the NDR 1B.

Figure 25:
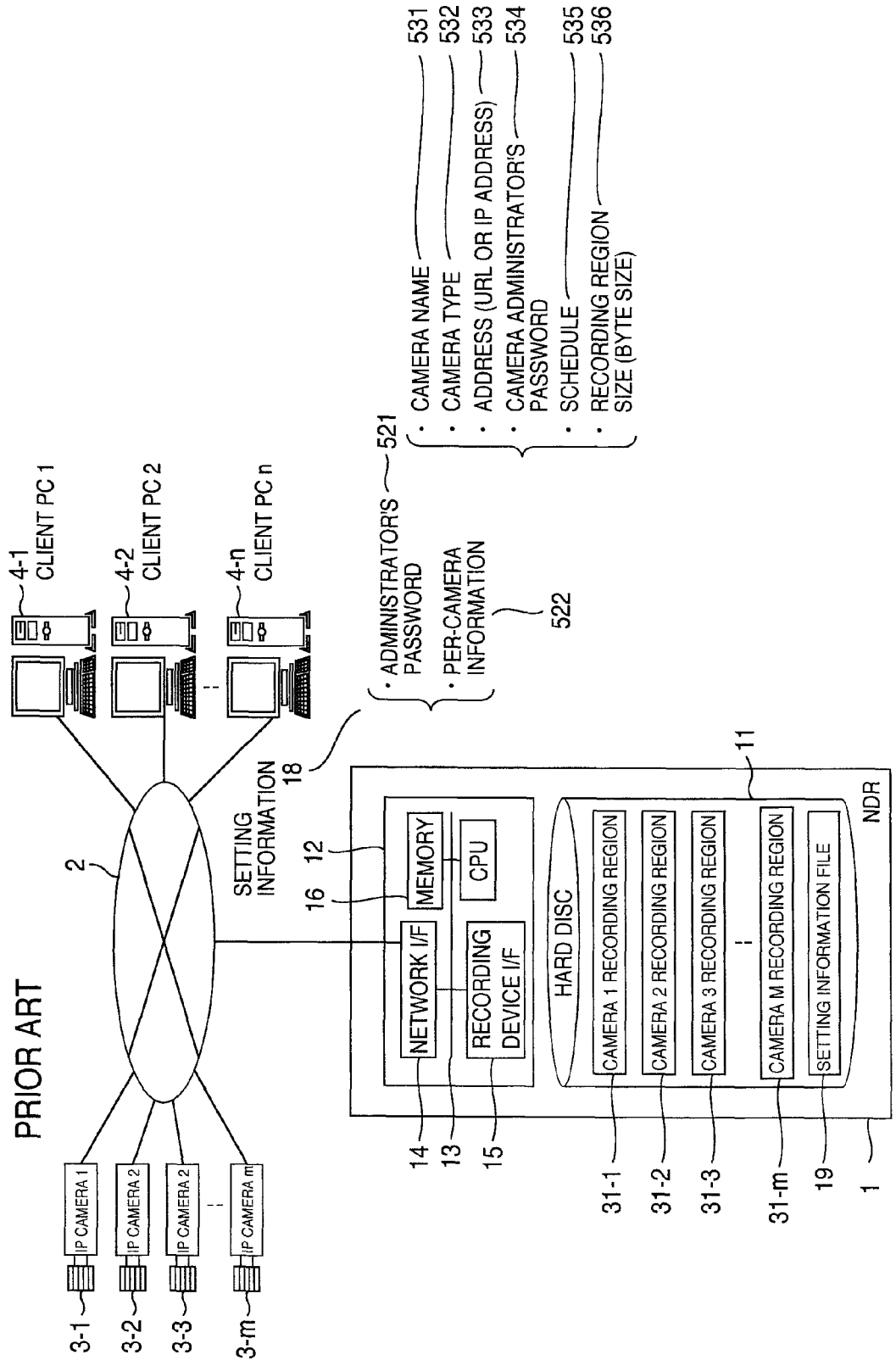
FIG. 25 shows a configuration example of a conventional image storage system.
Figure 26:
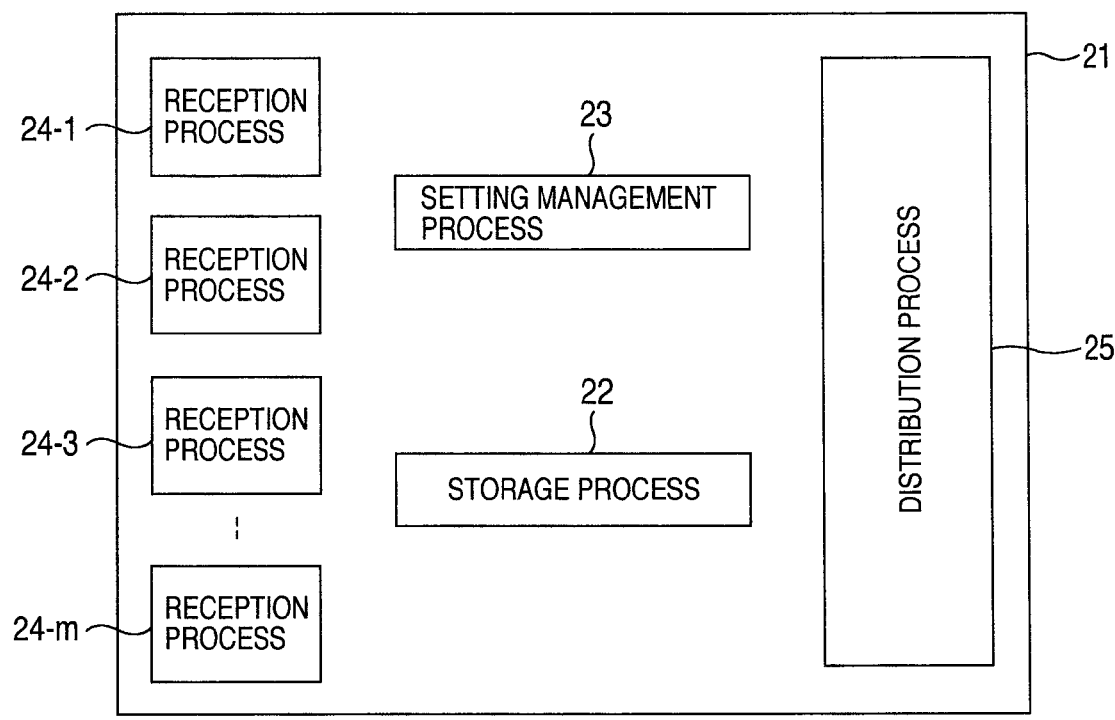
FIG. 26 shows an example of process configuration of software on the conventional NDR.
Figure 27:
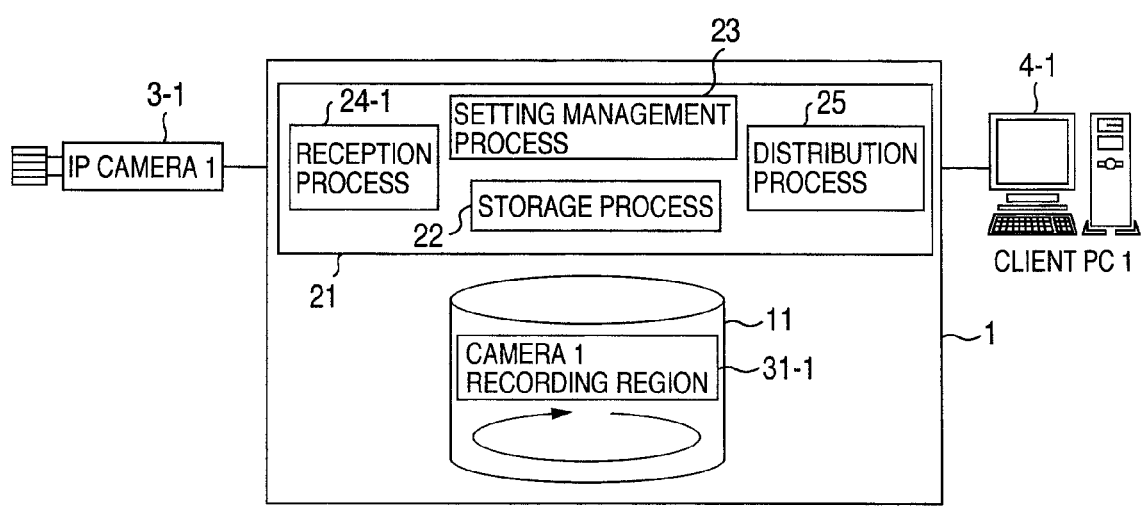
FIG. 27 shows an example of recording into a camera recording region in the conventional NDR.

Moreover, for example, the per-camera information 522 like the one shown in FIG. 25 is stored in both of the NDR 1A and NDR 1B and the information contents of them are identical.

Figure 2:
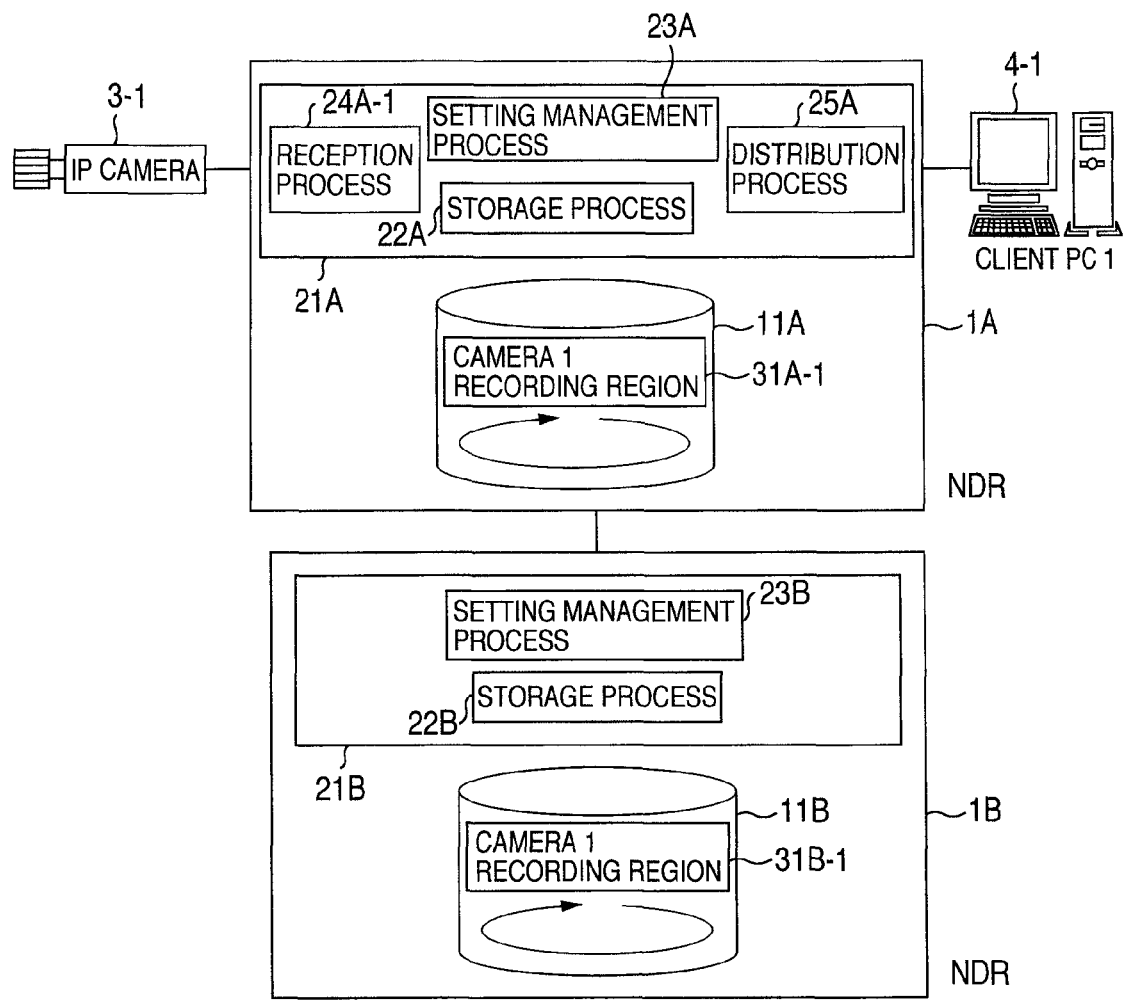
FIG. 2 shows a configuration example of software operating on two NDR.

FIG. 2 shows a configuration example of software operating on the two NDR 1A, 1B.

In this example, the NDR 1A is operating in the master mode while the NDR 1B is operating in the slave mode.

Moreover, for simplifying the explanation, it is assumed than one IP camera (IP camera 3-1) is connected and one client PC (client PC 4-1) is connected.

On the NDR 1A operating in the master mode, the setting management process 23A, the storage process 22A, the reception process 24A-1, and the distribution process 25A are operating as the process 21A.

On the NDR 1B operating in the slave mode, the setting management process 23B and the storage process 22B are operating.

The reception process 24A-1 of the NDR 1A operating in the master mode acquires image data from the IP camera 3-1 and distributes the image data alternately to the storage process 22A of the master side and the storage process 22B of the slave side so as to performed distributed recording.

The distribution process 25A integrates the image data distributed in the storage process 22A of the master side and the storage process 22B of the slave side for distribution without causing the external client PC 4-1 to recognize that the image data is distributed in the two NDR 1A, 1B.

When performing forward reproduction on the time series, the client PC 4-1 issues an instruction to the distribution process 25A top performs forward reproduction in the time series. In response to this, the distribution process 25A acquires image data from the storage process 22A of the master side and the storage process 22B of the slave side and sorts the acquired image data in the distribution process 25A so that the distribution process is arranged in the time series before transmitting the image data to the client PC 4-1 in the chronological order.

It should be noted that sorting of the image data may be performed, for example, in the client PC 4-1 instead of performing it in the NDR 1A. Moreover, the NDR 1A may not only transmit the image data in the chronological order to the client PC 4-1 via the network 2 but also output the image data to a monitor or the like.

In this example, one IP camera 3 (3-1 to 3-m) corresponds to one reception process 24A (24A-1 to 24A-m). Moreover, one reception process 24A (24A-1 to 24A-m) corresponds to one image capture thread of the storage process 22A, 22B.

When the number of IP cameras 3 (3-1 to 3-m) is increased, the number of the reception processes 24A (24A-1 to 24A-m) and the number of the image capture threads of the storage process 22A, 22B are also increased. Even if the number of the IP cameras 3 (3-1 to 3-m) is increased, respective operations (operation of the image capture thread of the reception process 24A (24A-1 to 24A-m) and the storage process 22A, 22B) are identical to the operations when the number of the IP cameras (3-1 to 3-m) is one.

Next, explanation will be given on a flow of processes upon start of the NDR 1A, 1B, a flow of processes upon start of the respective processes, the internal structure of each process, and a flow of processes during a routine state of each process.

Figure 3:
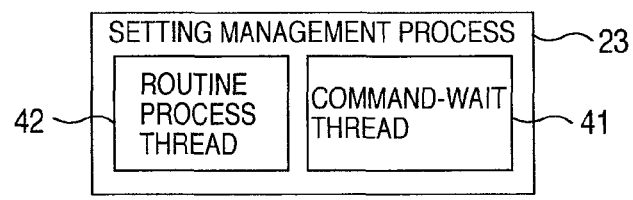
FIG. 3 shows a configuration example of a setting management process.

FIG. 3 shows a configuration example of the setting management process 23 (23A, 23B).

The setting management process 23 includes a command-wait thread 41 and a routine process thread 42 as two threads each operating independently in the process.

The command-wait thread 41 is a thread for waiting for a command from outside such as a setting modification and shut down from outside.

The routine process thread 42 performs a process for start and then changes the operation according to the operation mode of the even-odd distributed recording of the device, i.e., the master mode or the slave mode. Moreover, the routine process thread 42 periodically performs heartbeat with the NDR 1A, 1B constituting a pair.

The routine process thread 42 of the setting management process 23 starts processing immediately after start of the OS (Operating System) after the power of the NDR 1A, 1B is turned ON.

Figure 4:
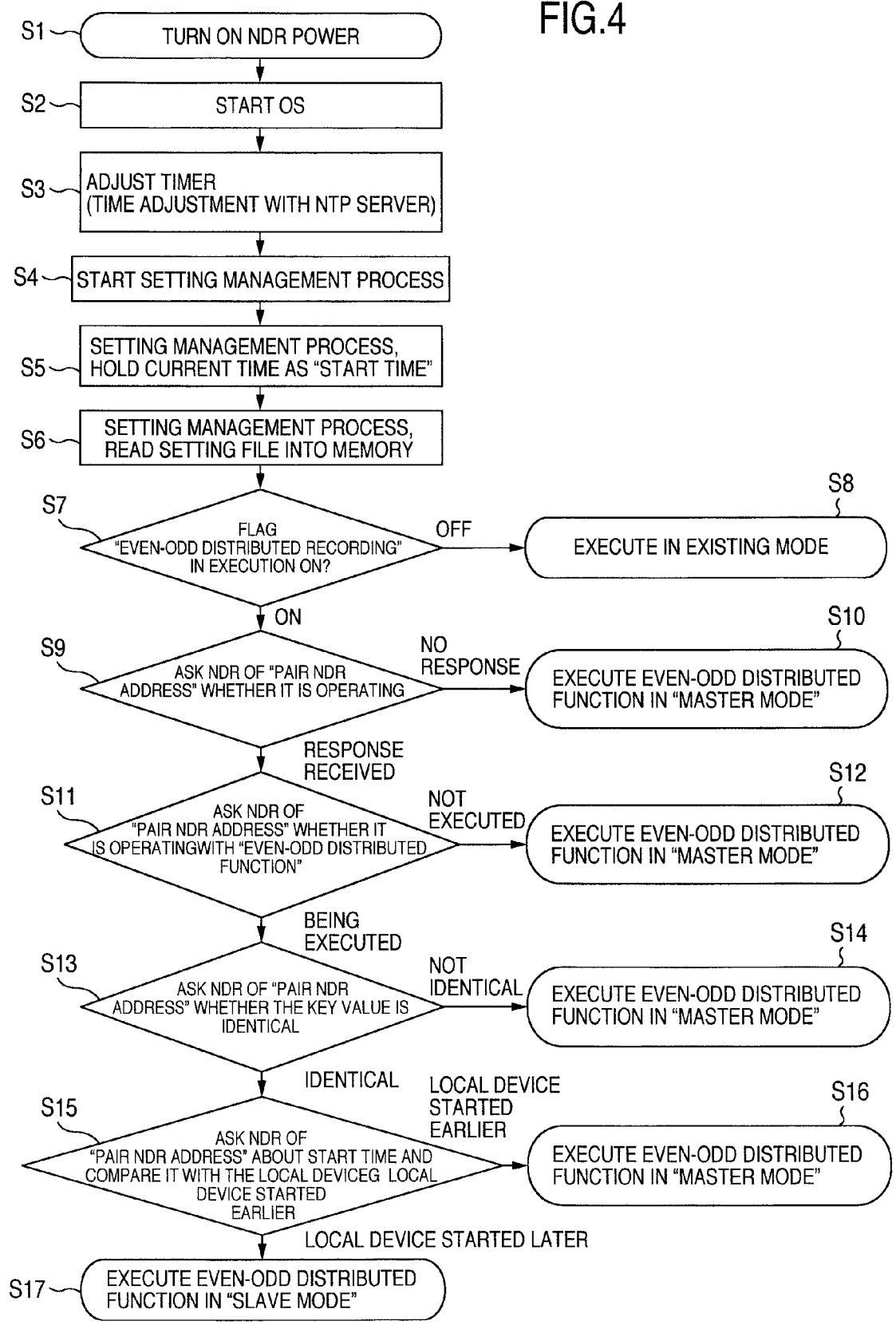
FIG. 4 shows an example of flow of processes upon NDR start.

FIG. 4 shows an example of the flow of the processes upon start of the NDR 1A, 1B. Upon start, it is decided whether to execute the even-odd distributed recording. If YES, it is decided to performs start in the master mode or the slave mode.

More specifically, firstly, when the power of the NDR 1A, 1B is turned ON (step S1), the OS of the NDR 1A, 1B starts operation (step S2), and timer matching is performed by accessing the NTP (Network Time Protocol) server so as to match the time of the NDR 1A with the NDR 1B (step S3).

Next, the setting management process 23 is started (step S4) and the command-wait thread 41 and the routine process thread 42 start processing.

The below-explained processes of steps S5 to S17, S21 to S28, S41 to S44, S51 to S61, S71 to S85 are performed by the routine process thread 42 of the setting management process 23.

Firstly, the current time is held as the start time 503 (step S5) and the contents of the setting information files 19A, 19B are read into the memories 16A, 16B so as to be the setting information 18A, 18B (step S6).

Next, the process is branched according to the value indicated by the flag 501 of "the even-odd distributed recording" being executed (step S7).

If the flag 501 of "the even-odd distributed recording" being executed indicates OFF, no even-odd distributed recording is executed and, for example, the existing operation of the NDR as shown in the prior art is performed (step S8).

On the other hand, if the flag 501 of "the even-odd distributed recording" being executed has a value indicating ON, communication is tried to an address indicated by "the pair NDR address" 505 so as to check whether the corresponding NDR 1A, 1B are in operation. The processing is branched according to the check result (step S9).

If no response is obtained, the NDR 1A, 1B constituting a pair is not in operation. In order to execute the even-odd distributed recording only by the local device, the NDR 1A, 1B execute the even-odd distributed recording in the master mode (step S10). In this case, control is passed to the process of step S21 shown in FIG. 5.

Figure 8:
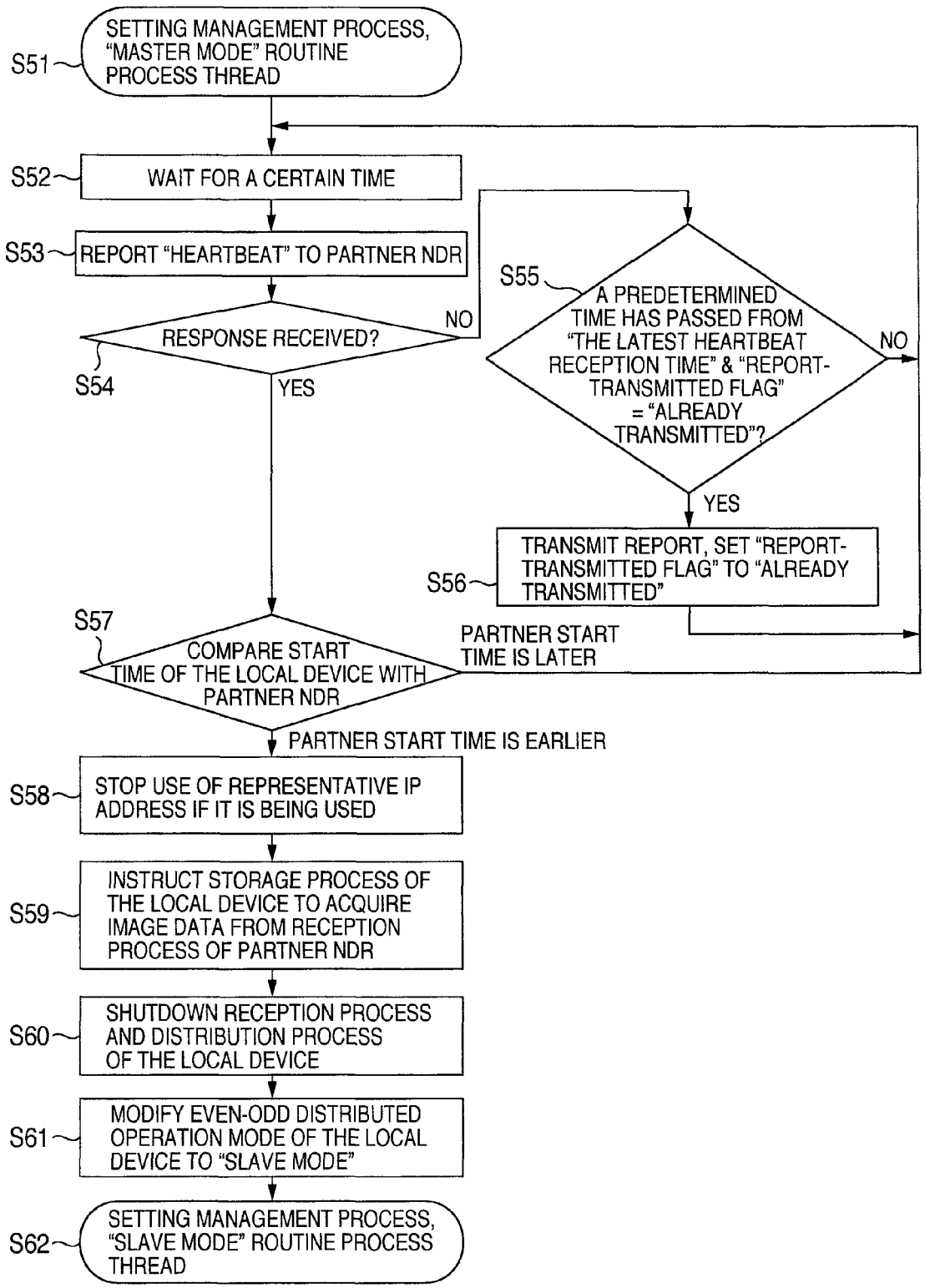
FIG. 8 shows an example of flow of processes performed by a routine process thread of the setting management process during master mode operation.

It should be noted that when executing the even-odd distributed recording only by the local device, it operates as "the degraded master" by the process of step S56 shown in FIG. 8.

On the other hand, as the result of communication tried to the address indicated by "the pair NDR address" 505, if the corresponding NDR 1A, 1B are operating and a response is obtained, an inquiry is made to the NDR 1A, 1B of the address indicated by "the pair NDR address" whether they are executing the even-odd distributed recording. According to the response contents, the processing is branched (step S11).

Upon reception of a report that the partner NDR 1A, 1B is not executing "the even-odd distributed recording", the pair-constituting NDR 1A, 1B not executing the even-odd distributed recording starts execution of the even-odd distributed recording in the master mode (step S12). In this case, the control is passed to the process of step S21 shown in FIG. 5.

On the other hand, upon reception of a report that the partner NDR 1A, 1B is executing "the even-odd distributed recording", an inquiry is made to the NDR 1A, 1B indicated by the "pair NDR address" 505 to decide whether the pair key value 504 is identical and the process is branched according to the response content (step S13).

When the value is not matched with the key value of the partner NDR 1A, 1B, it is judged that there is a great possibility that the pair specification of the even-odd distributed recording is erroneous. In order to execute the even-odd distributed recording only by the local device, the NDR 1A, 1B executes the even-odd distributed recording in the master mode (step S14). In this case, control is passed to step S21 shown in FIG. 5.

On the other hand, when the key value of the partner NDR 1A, 1B is matched with the value, the NDR 1A, 1B indicated by "the pair NDR address" 505 is asked about the start time. The start time is compared to the start time 504 of the local device and the process is branched according to the comparison result (step S15).

When the start time of the local device is earlier, the NDR 1A, 1B executes the even-odd distributed recording in the master mode so as to set the one having the older start time to the master mode (step S16). In this case, control is passed to the process of step S21 shown in FIG. 5.

On the other hand, when the start time of the local device is later, the local device executes the even-odd distributed recording in the slave mode (step S17). In this case, control is passed to the process of step S31 shown in FIG. 6.

Figure 5:
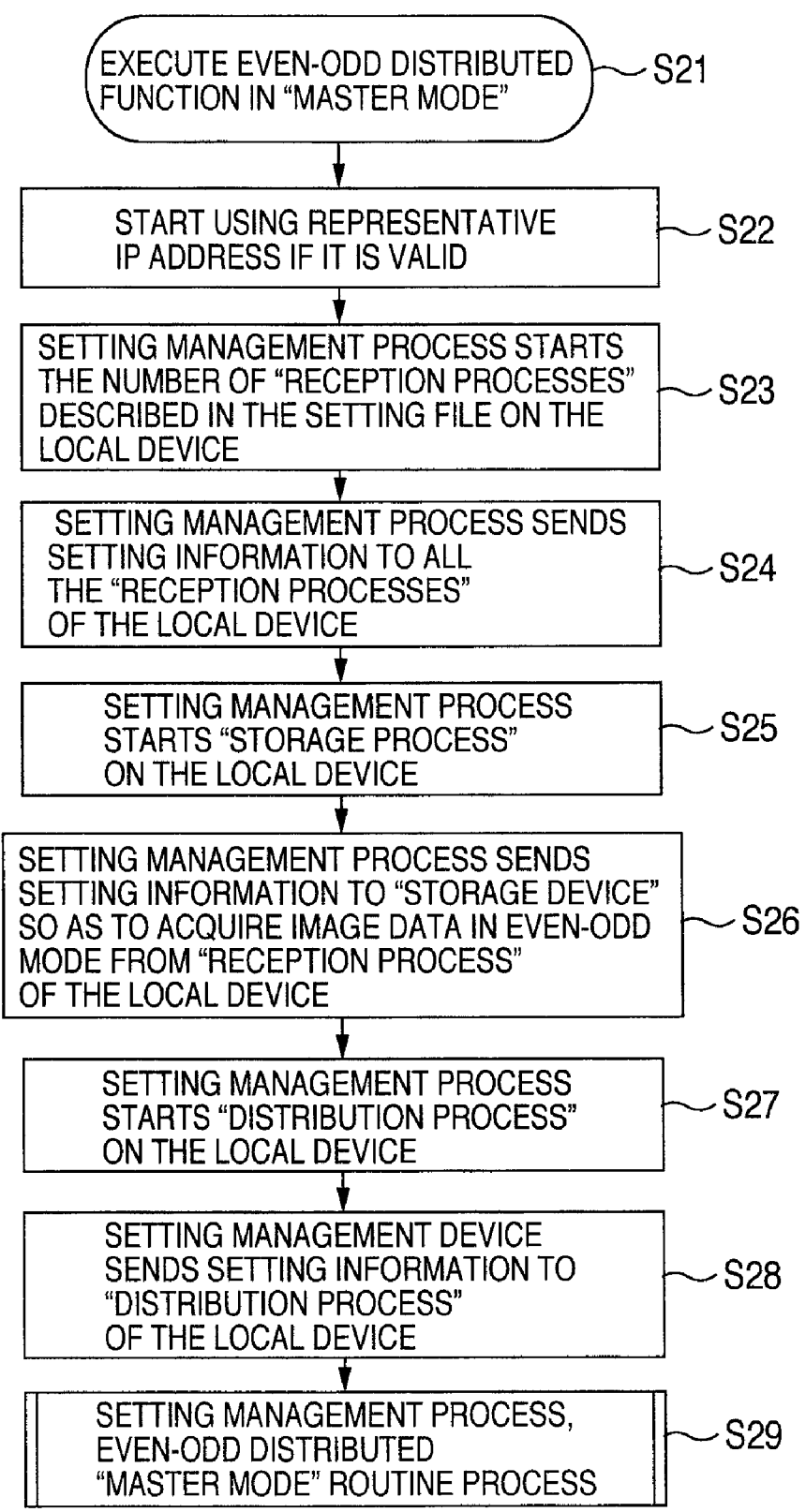
FIG. 5 shows an example of flow of processes performed in the master mode.

FIG. 5 shows an example of a flow of the processes performed in the master mode.

When execution of the even-odd distributed recording is started in "the master mode" (step S21) and if the value of the representative IP address 514 is a valid value, use of the IP address corresponding to the value of the representative IP address 514 is started (step S22).

Next, the routine process thread 42 of the setting management process 23 reads the number of IP cameras 3 (3-1 to 3-m) to be connected, from the setting information 18A, 18B and starts the corresponding number of reception processes 24A (24A-1 to 24A-m), 24B (24B-1 to 24B-m) (step S23). In this example, one reception process 24A (24A-1 to 24A-m), 24B (24B-1 to 24B-m) is used for one IP camera 3 (3-1 to 3-m) for capturing image data.

Next, the routine process thread 42 of the setting management process 23 transmits setting information 531 to 536 required for acquiring image data by the reception processes 24A (24A-1 to 24A-m), and 24B (24B-1 to 24B-m), to the started reception processes 24A (24A-1 to 24A-m), and 24B (24B-1 to 24B-m) (step S24).

Next, the routine process thread 42 of the setting management process 23 starts the storage process 22A, 22B on the local device (step S25) and transmits setting information required for image recording to the started storage process 22A, 22B (step S26). The setting information is information used when capturing image data in the even-odd distributed recording method from the reception process 24A (24A-1 to 24A-m), 24B (24B-1 to 24B-m) of the local device. For example, the information indicates from which reception process 24A (24A-1 to 24A-m), 24B (24B-1 to 24B-m) the image data is received and in which camera recording region 31A (31A-1 to 31A-m), 31B (31B-1 to 31B-m) the image data is recorded. Moreover, since the operation is in the master mode, setting information for capturing image from the reception process 24A (24A-1 to 24A-m), 24B (24B-1 to 24B-m) of the local device is transmitted to the storage process 2.2 A, 22B.

Next, the routine process thread 42 of the setting management process 23 starts the distribution process 25A, 25B on the local device (step S27) and transmits setting information required for image distribution, to the started distribution process 25A, 25B (step S28).

The routine process thread of the setting management process 23 starts a loop process (routine process) for the mater mode of the even-odd distributed recording. In this case, control is passed to the process of step S51 shown in FIG. 8 (step S29).

FIG. 6 shows an example of a flow of processes performed in the slave mode.

When execution of the even-odd distributed recording in "the slave mode" is started (step S31), the routine process thread 42 of the setting management process 23 starts the storage process 22A, 22B on the local device (step S32).

Next, the routine process thread 42 of the setting management process 23 transmits setting information required for image recording, to the started storage process 22A, 22B (step S33). The setting information is information used when acquiring image data in the even-odd distributed method from the reception process 24A (24A-1 to 24A-m), 24B (24B-1 to 24B-m) of the partner side. For example, the information indicates from which reception process 24A (24A-1 to 24A-m), 24B (24B-1 to 24B-m) the image data is received and in which camera recording region 31A (31A-1 to 31A-m), 31B (31B-1 to 31B-m) the image data is recorded. Since the operation is in the slave mode, setting information for acquiring an image from the reception process 24A (24A-1 to 24A-m), 24B (24B-1 to 24B-m) operating on the pair NDR 1A, 1B is transmitted to the storage process 22A, 22B.

The routine process thread 42 of the setting management process 23 starts a loop process (routine process) for the slave mode of the even-odd distributed recording (step S34). In this case, control is passed to the process of step S71 shown in FIG. 9.

FIG. 7 shows an example of a flow of the processes performed by the command-wait thread 41 of the setting management process 23. The command-wait thread 41 of the setting management process 23 is a thread for waiting for a command input from outside and performs a process corresponding to the inputted command.

When execution of the command-wait thread 41 of the setting management process 23 is started (step S41), the command-wait thread 41 of the setting management process 23 waits until a command is received from outside the process (step S42).

Next, when a command is received, it is judged whether the command from outside the process is a report of "the heartbeat" from the pair NDR 1A, 1B of the even-odd distributed recording (step S43).

If the judgment results in that the command from outside the process is a report of "heartbeat" from the pair NDR 1A, 1B of even-odd distributed recording, a return value of heartbeat is transmitted. The return value includes "the start time" 503. Moreover, "the last heartbeat reception time" 507 is updated to the current time. Moreover, "the report-transmitted flag" 509 is set to a value of "not reported" (step S44).

When the heartbeat is received, the state is judged to be normal. When the reception of the heartbeat is delayed, a report is issued. In order to avoid repetition of issuance of the report, the report-transmitted flag 509 is prepared. If a heartbeat is received after a report is sent, it is judged that the state is recovered to the normal state and the report-transmitted flag 509 is returned to the state of "not reported". Control is returned to the process of step S42.

On the other hand, when the command from outside the process is other than the report of "the heartbeat", it is judged whether the command from outside the process is a command of "shut down" as a stop instruction from the administrator (step S45).

If the judgment results in that the command from outside the process is other than the command of "shut down", a setting modification process of the setting management process 23 is executed (step S46). More specifically, when the command from outside the process is other than "heartbeat" or "shutdown", the command may be a check system command for acquiring an operation state of each process or a setting modification system command for modifying/stopping addition/operation state of each of processes operating in the local device. When the command-wait thread 41 of the setting management process 23 has executed a process of a command received from outside (such as a process start, stop, setting modification or the like), control is returned to the process of step S42.

On the other hand, when the command from outside the process is a command of "shut down", the shut down instruction is issued to the distribution process 25A, 25B, the reception process 24A (24A-1 to 24A-m), 24B (24B-1 to 24B-m), the storage process 22A, 22B operating in the local device and then the shut down instruction is issued to the OS (step S47).

In response to the shut down instruction to the OS, hardware of the NDR 1A, 1B stops (step S48).

FIG. 8 shows an example of flow of processes performed by the routine process thread 42 of the setting management process 23 during master mode operation.

In the master mode operation of the routine process thread 42 of the setting management process 23, the heartbeat is periodically performed on the pair NDR 1A, 1B so as to confirm the normal operation. Moreover, monitor is performed whether the condition of transition to the slave mode is satisfied. When the condition is satisfied, the slave mode is set in.

When the routine process thread 42 of the setting management process 23 starts operation in the master mode (step S51), a wait state continues for a time of the value of the heartbeat time interval 511 described in the setting information file 19A, 19B (step S52).

Next, the heartbeat command is issued to the pair NDR 1A, 1B of the even-odd distributed recording (step S53) and the process is branched according to presence/absence of a heartbeat response (step S54).

If no heartbeat response is received and the current time indicates that a predetermined time ("failure judgment threshold value time" 512) has elapsed from the latest heartbeat reception time 507 and "the report-transmitted flag" 509 does not satisfy the condition "not reported", control is returned to the process of step S52 (step S55).

On the other hand, if the condition is satisfied, a mail is transmitted to report that "stop of the partner NDR is detected" to the mail address registered in the "destination email address" 513. Moreover, "the report-transmitted flag" 509 is set to "report transmitted" and "the even-odd distributed recording operation mode" 508 is modified to "the degraded master" (step S56). Control is returned to the process of step S52.

If a heartbeat response is received in the process of step S54, "the even-odd distributed recording operation mode" 508 of the local device is modified to "the normal master". "The start time" 503 of the partner contained in the heartbeat return value is compared to "the start time" 503 of the local device (step S57). If the partner time is later, control is returned to the process of step S52.

On the other hand, if the partner time is earlier and the IP address of the representative IP address 514 is used, the use of the representative IP address is terminated (step S58).

Moreover, since the start time 503 of the partner NDR 1A, 1B is earlier, the partner is set to the master mode and the local device is shifted to the slave mode. For this, an instruction is made to the storage process 22A, 22B of the local device to acquire image data from the reception process 24A (24A-1 to 24A-m), 24B (24B-1 to 24B-m) of the partner NDR 1A, 1B (step S59). Moreover, the reception process 24A (24A-1 to 24A-m), 24B (24B-1 to 24B-m) and the distribution process 25A, 25B of the local device are shut down (step S60).

Moreover, "the even-odd distributed recording operation mode" 508 of the local device is modified to "the normal slave" (step S61).

Figure 9:
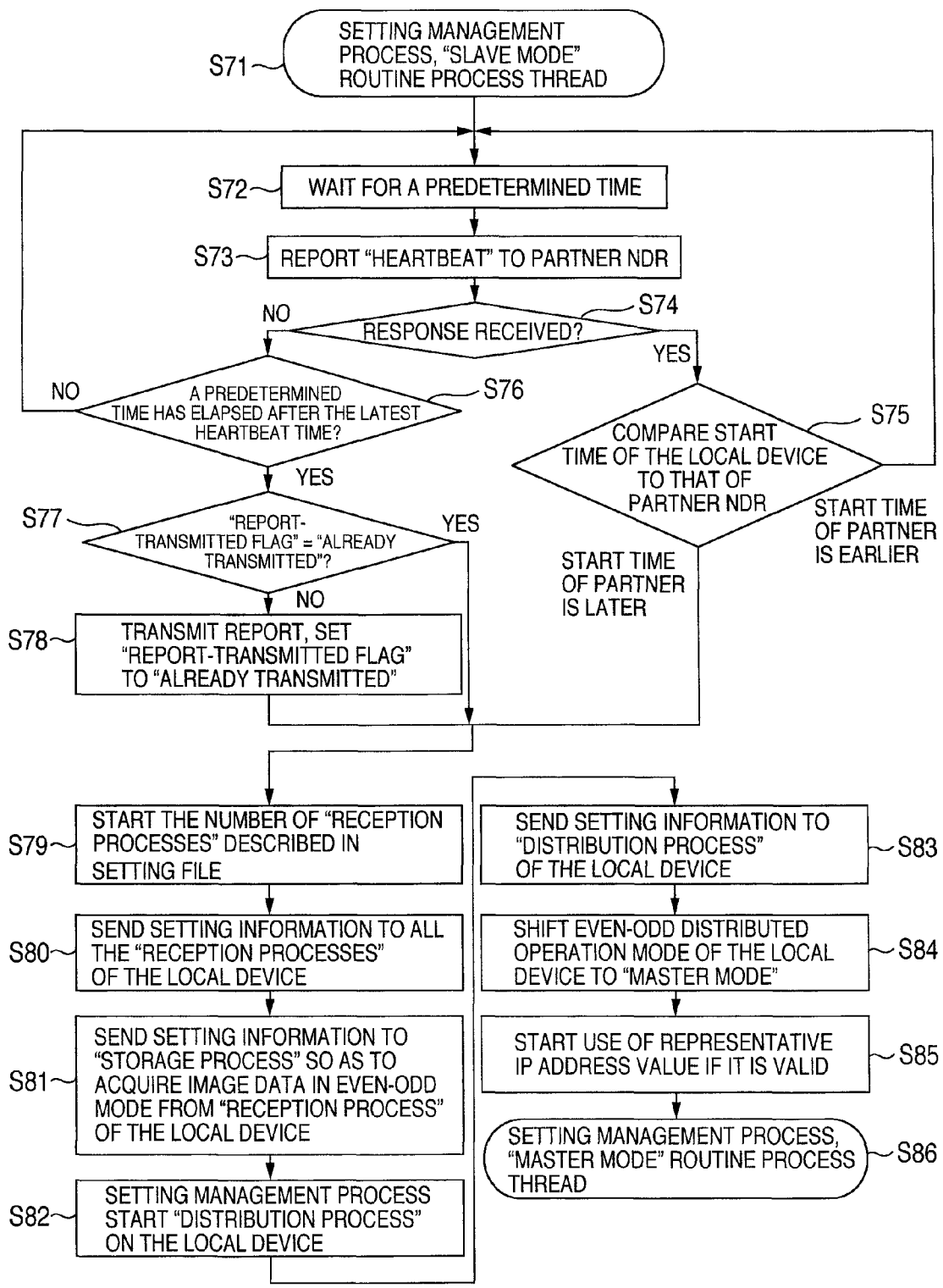
FIG. 9 shows an example of flow of processes performed by a routine process sled of the setting management process during slave mode operation.

In order to cause the process of the routine process thread 42 of the setting management process 23 to operate in "the slave mode", control is passed to the process of step S71 shown in FIG. 9 (step S62).

FIG. 9 shows an example of flow of processes performed by the routine process thread 42 of the setting management process 23 during the slave mode operation.

The operation of the routine process thread 42 of the setting management process 23 in the slave mode is to periodically execute heartbeat to the pair NDR 1A, 1B so as to confirm the normal operation. Moreover, monitor is performed to decide whether the condition to shift to the master mode is satisfied. When the condition is satisfied, the mode is shifted to the master mode.

When the operation of the routine process thread 42 of the setting management process 23 in the slave mode is started (step S71), "the even-odd distributed recording operation mode" 508 of the local device is modified to "the normal slave".

Next, a wait state of a value of the heartbeat time interval 511 described in the setting information file 19A, 19B continues (step S72). Then, a heartbeat command is issued to the pair NDR 1A, 1B of the even-odd distributed recording (step S73) and the processing is branched according to the presence/absence of the heartbeat response (step S74).

When a heartbeat response is received, "the start time" 503 of the partner contained in the heartbeat return value is compared to "the start time" 503 of the local device (step S75). If the start time of the partner is later, control is passed to the process of step S79. If the start time of the partner is earlier, control is returned to the process of step S72.

On the other hand, if no heartbeat response is received, it is judged whether the current time indicates that a predetermined time ("failure judgment threshold value time" 512) has elapsed from "the latest heartbeat reception time" (step S76). If the predetermined time has not yet elapsed, control is returned to the process of step S72.

Moreover, if no heartbeat response is received and the current time indicates that the predetermined time ("failure judgment threshold value time" 512) has elapsed from "the latest heartbeat reception time", it is judged whether "the report-transmitted flag" 509 is "not yet transmitted" (step S77).

If "report already transmitted", control is passed to the process of step S79. On the other hand, if "not yet transmitted", an email is transmitted to report that "stop of the partner NDR is detected" to the mail address registered in the "destination email address" 513. Moreover, "the report-transmitted flag" 509 is set to "already transmitted" (step S78) and control is passed to the process of step S79.

When the start time 503 of the local device is earlier than the start time of the partner NDR 1A, 1B, i.e., when the partner start time is later (step S75) and the partner NDR 1A, 1B is in an operation stop state (steps S76 to S78), the local device satisfies the condition to operate in the master mode and the local device is shifted from the slave mode to the master mode.

Firstly, the number of "reception processes" described in the setting information file 19A, 19B are started (step S79). Each reception process transmits setting information 531 to 536 (per-camera information 522) required for acquiring image data to the started reception processes 24A (24A-1 to 24A-m), and 24B (24B-1 to 24B-m) (step S80).

Moreover, setting information required for image recording is transmitted to the storage process 22A, 22B, i.e., from which reception process 24A (24A-1 to 24A-m), 24B (24B-1 to 24B-m) the image data is received and to which camera recording region 31A (31A-1 to 31A-m), 31B (31B-1 to 31B-m) the image data is recorded (step S81). In order to operate in the master mode, the reception process 24A (24A-1 to 24A-m), 24B (24B-1 to 24B-m) of the local device transmits setting information for acquiring an image in the even-odd mode to the storage process 22A, 22B.

Moreover, the setting management process 23 starts the distribution process 25A, 25B on the local device (step S82) and transmits setting information required for image distribution, to the started distribution process 25A, 25B (step S83).

Moreover, when the representative IP address 514 has a valid value, use of the IP address of the value of the representative IP address 514 is started (step S85).

The process of the routine process thread 42 of the setting management process 23 is decided to operate in "the master mode" (step S86) and control is passed to the process of step S51 shown in FIG. 8.

Figure 10:
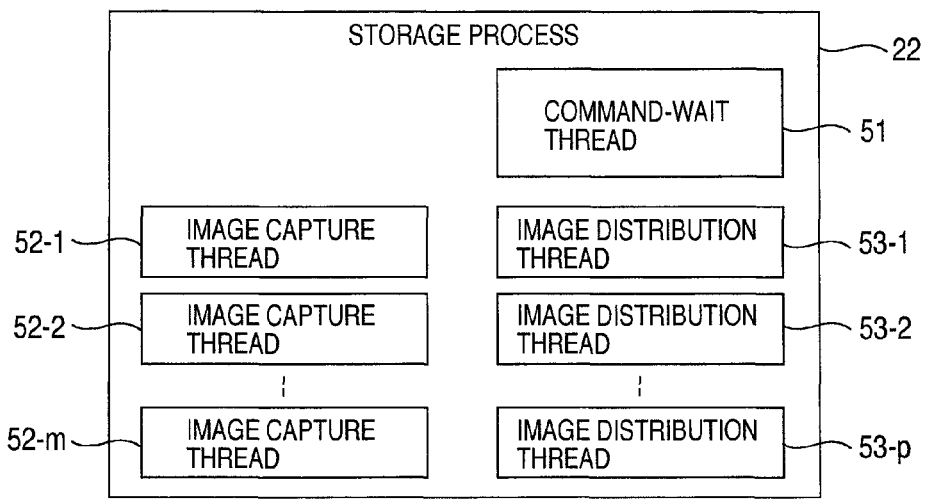
FIG. 10 shows a configuration example of a storage process.

FIG. 10 shows a configuration example of the storage process 22 (22A, 22B).

The storage process 22 includes three types of thread operating independently from one another in the process, i.e., a command-wait thread 51, m image capture threads 52 (52-1 to 52-m), and p image distribution threads 53 (53-1 to 53-p).

The number of the image capture threads 52 (52-1 to 52-m) and the number of image distribution threads (53-1 to 53-p) in the storage process 22 are based on the setting information 18A, 18B acquired from the setting management process 23.

In the image capture threads 52 (52-1 to 52-m), one thread corresponds to one reception process 24A (24A-1 to 24A-m), 24B (24B-1 to 24B-m) so as to be responsible for write operation into one camera recording region 31A (31A-1 to 31A-m), 31B (31B-1 to 31B-m), performs log-in to the reception process 24A (24A-1 to 24A-m), 24B (24B-1 to 24B-m) specified by the setting information 18A, 18B so as to acquire image data from it, and additionally write the image data to the corresponding camera recording region 31A (31A-1 to 31A-m), 31B (31B-1 to 31B-m). Upon log-in to the reception process 24A (24A-1 to 24A-m), 24B (24B-1 to 24B-m), a message of the even-odd distributed recording and the pair key value 504 are sent to the reception process 24A (24A-1 to 24A-m), 24B (24B-1 to 24B-m). The reception process 24A (24A-1 to 24A-m), 24B (24B-1 to 24B-m) judges the combination of the pair NDR 1A, 1B of the even-odd distributed recording.

The image distribution thread 53 (53-1 to 53- p) receives an image data request from the distribution process 25A, 25B, reads out image data from the camera recording region 31A (31A-1 to 31A-m), 31B (31B-1 to 31B-m) of the recording device 11A, 11B, and transmits (returns) the image data to the distribution process 25A, 25B.

The command-wait thread 51 is a thread for waiting for a command from the setting management process 23. When a command is received from outside and the processing of the received command is executed, the command-wait thread 51 enters a state for waiting for the next command. Command to be waited for may be check system commands for acquiring the operation state of each process or setting modification system commands for modifying/terminating addition/operation state of a thread operating on the local device.

More specifically, "the setting modification" command modifies operation of each thread such as modification of start or stop of an arbitrary image reception thread 52 (52-1 to 52-m) or the reception process 24A (24A-1 to 24A-m), 24B (24B-1 to 24-m) from which an image is acquired, and the number of image distribution threads 53 (53-1 to 53-p).

Moreover, when "the shut down command" is received, all the threads (image capture thread, image distribution thread) are terminated and the storage process 22 is terminated (shut down).

Figure 11:
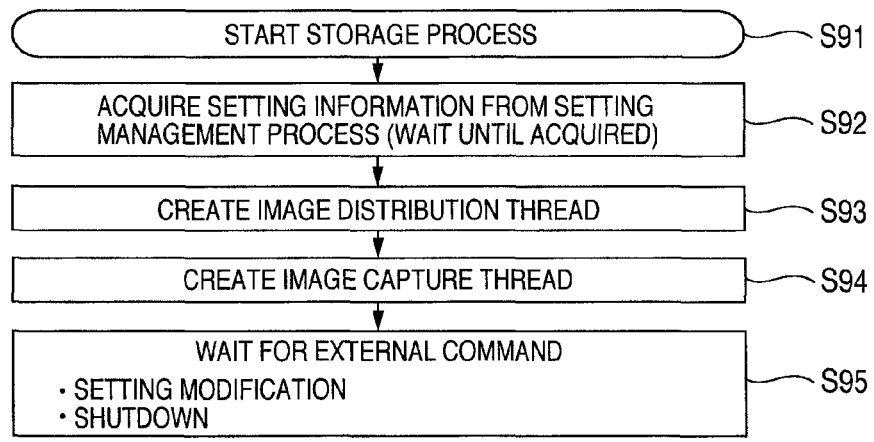
FIG. 11 shows an example of flow of processes upon start of the storage process.

FIG. 11 shows an example of flow of processes upon start of the storage process.

After the storage process 22 is started (step S91), a wait state continues until the setting information 18A, 18B is received from the routine process thread 42 of the setting management process 23 (step S92).

When the setting information 18A, 18B are acquired, the number of distribution threads 53 (53-1 to 53-p) specified in the setting information 18A, 18B are started (step S93) and the number of image capture threads 52 (52-1 to 52-m) specified in the setting information 18A, 18B is are started (step S94).

The command-wait thread 51 starts waiting for an external command and performs setting modification and shut down according to a received command (step S95).

Figure 12:
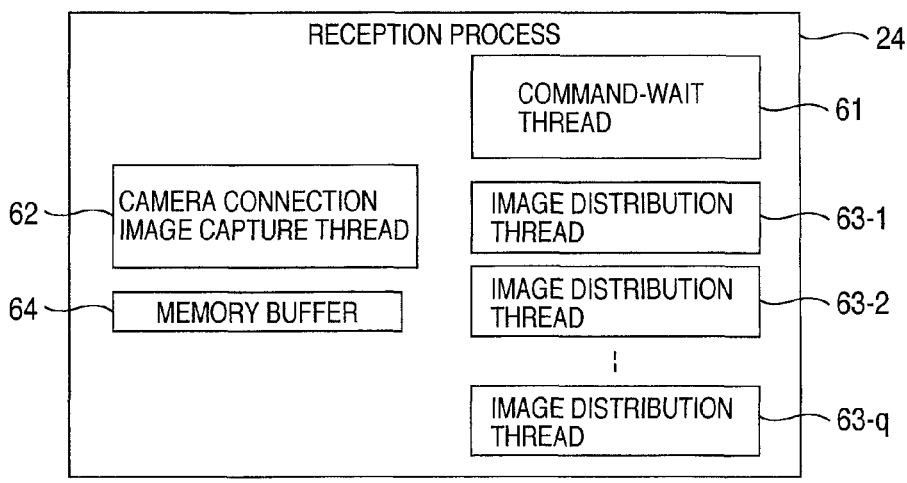
FIG. 12 shows a configuration example of a reception process.

FIG. 12 shows a configuration example of the reception process 24 (24A, 24B).

The reception process 24 includes three types of threads operating independently in the process, i.e., a command-wait thread 61, a camera connection image capture thread 62, and q image distribution threads 63 (63-1 to 63-q). The reception process 24 also has a memory buffer 64 capable of temporarily holding tens to hundreds of frames of image data.

The number of threads of the image distribution thread 63 (63-1 to 63-q) in the reception process 24 is based on the setting information 18A, 18B acquired from the setting management process 23.

The camera connection image capture thread 62 is connected to the IP camera 3 (3-1 to 3-m) and communicates network communication with the IP camera 3 (3-1 to 3-m) indicated by the address 533 so as to acquired image data and hold it in an image memory buffer 64. The frame rate for acquiring the image data from the IP camera 3 (3-1 to 3-m) is based on the information of the schedule 535. Moreover, one reception thread is used in the reception process 24.

After receiving log-in from the storage process 22, the image distribution thread 63 (63-1 to 63-q) reads out image data which has not yet distributed, from the image memory buffer 64 and transmits the image data to the storage process 22.

Moreover, the image distribution thread 63 (63-1 to 63-q) modifies the distribution method according to the mode specification upon log-in.

When the log-in from the storage process 22 indicates the normal mode, all the image data obtained by the camera connection image capture thread 62 are transmitted to the storage process 22.

On the other hand, when the log-in from the storage process 22 indicates the even-odd distributed recording mode and two storage processes 22 (22A, 22B) constituting pair are logged in, the image data obtained by the camera connection image capture thread 62 are transmitted alternately to the storage process (22A, 22B) of the pair. Moreover, when the log-in from the storage process 22 indicates the even-odd distributed recording mode but only one of the storage processes 22 (22A or 22B) is logged in, all the image data obtained by the camera connection image capture thread 62 are transmitted to the storage process 22 which has logged in.

The command-wait thread 61 is a thread for waiting for a command from the setting management process 23. When a command is received from outside and execution of processing of the received command is completed, the command-wait thread 61 enters a wait state for the next command. The command-wait command may be a check system command for acquiring an operation state of each process or a setting modification command for performing modification/stop of addition/operation state of a thread operating on the local device.

More specifically, for example, the "setting modification" command modifies operation of each thread such as modification of the address 533 of the IP camera 3 (3-1 to 3-m) from which image data is acquired by the camera connection image capture thread 62 (setting modification of the connected IP camera), modification of information of the schedule 535 indicating the frame rate at which the image data is acquired, and the modification of the number of image distribution threads 63 (63-1 to 63-q).

Moreover, when the "shut down" command is received, all the threads (camera connection image capture thread, image distribution thread) are terminated and the reception process 24 is terminated (shut down).

Figure 13:
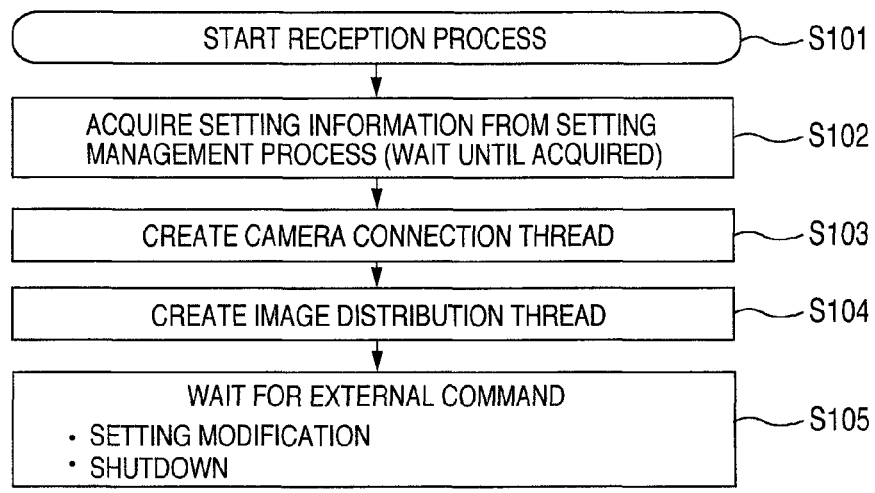
FIG. 13 shows an example of flow of processes upon start of the reception process.

FIG. 13 shows an example of flow of processes upon start of the reception process 24.

When the reception process 24 is started, a memory region used by the image memory buffer 64 is allocated and zero-cleared (step S101).

After this, a wait state continues until the setting information 18A, 18B is received from the routine process thread 42 of the setting management process 23 (step S102)

When the setting information 18A, 18B is received, the camera connection image capture thread 62 is started (step S103) and the number of image distribution threads 63 (63-1 to 63-1) specified by the setting information 18A, 18B are started (step S104).

The command-wait thread 61 starts waiting for an external command and performs setting modification and shut down according to a received command (step S105).

Figure 14:
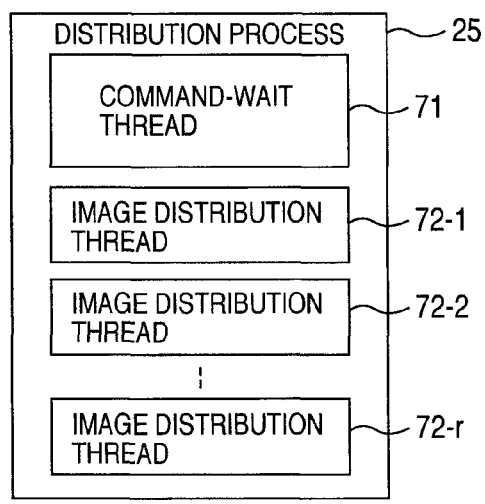
FIG. 14 shows a configuration example of a distribution process.

FIG. 14 shows a configuration example of the distribution process 25 (25A, 25B).

The distribution process 25 includes two types of thread operating independently in the process, i.e., the command-wait thread 71 and the r image distribution threads 72 (72-1 to 72-r).

The number of image distribution process 72 (72-1 to 72-r) in the distribution process 25 is based on the setting information 18A, 18B acquired from the setting management process 23.

Upon reception of an image request from a client PC 4 (4-1 to 4-n), the image distribution thread 72 (72-1 to 72-r) acquires image data from the storage process 22 (22A, 22B) and transmits the image data to the client PC 4 (4-1 to 4-n).

The image distribution thread 72 (72-1 to 72-r) modifies the distribution method depending on whether the even-odd distributed function is executed and both components of the pair are normally operating. That is, the image data capture process by the image distribution thread 72 (72-1 to 72-r) depends on whether the "even-odd distributed recording" flag 501 is executing the even-odd distributed mode and when operation is executed with the even-odd distributed function, the processing content is modified according to the value indicated by "the even-odd distributed recording mode" 508.

When the "even-odd distributed recording" flag 501 indicates "not executing", the NDR 1A, 1B are respectively operating in a normal mode for a single operation. Accordingly, the image distribution thread 72 (72-1 to 72-r) acquires image data from the storage process 22 (22A, 22b) on the NDR 1A, 1B of the local device and transmits the image data to the client PC 4 (4-1 to 4-n).

When the "even-odd distributed recording" flag 501 indicates "execution in progress" and "the even-odd distributed recording mode" 502 indicates the "degraded master" state, the even-odd distributed recording is being executed but only the local device is operating. Accordingly, the image distribution thread 72 (72-1 to 72-r) acquires image data from the storage process 22 (22A, 22B) on the NDR 1A, 1B of the local device and transmits the image data to the client PC 4 (4-1 to 4-n).

When the "even-odd distributed recording" flag 501 indicates "execution in progress" and "the even-odd distributed recording operation mode" 502 indicates the "normal master" state or the "normal slave" state, the both components of the pair of the even-odd distributed recording are normally operating. Accordingly, image data nearest to the request from the client PC 4 (4-1 to 4-n) is acquired from the storage process 22 (22A, 22B) on the both NDR 1A, 1B. The image data are compared to each other and the image data nearer to the request from the client PC (4-1 to 4-n) is transmitted to the client PC 4 (4-1 to 4-n).

The command-wait thread 71 is a thread for waiting for a command from the setting management process 23. When a command is received from outside and execution of the received command is completed, the command-wait thread 71 enters a state for waiting for the next command.

The wait command may be a command of a check system for acquiring an operation state of each process of a command of a setting modification system for modifying/terminating addition/operation state of a thread operating on the local device.

More specifically, for example, "the setting modification" command modifies operation of each thread and the modifies the number of image distribution threads 72 (72-1 to 72-r).

Moreover, upon reception of the "shut down" command, all the threads (image distribution threads) are terminated and the distribution process 25 is terminated (shut down).

Figure 15:
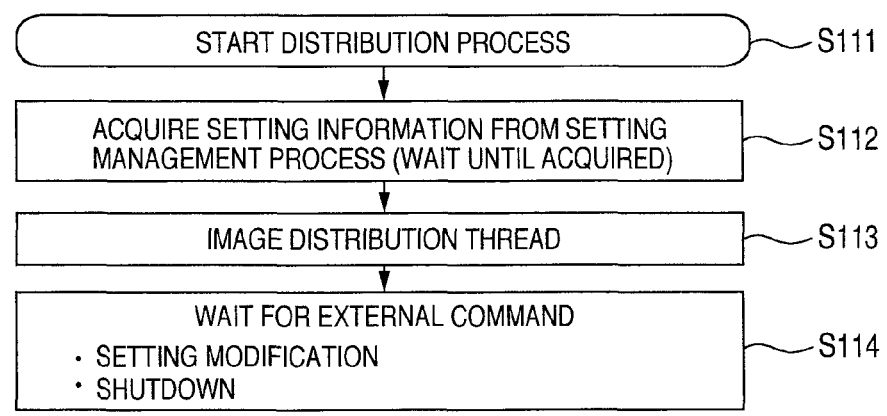
FIG. 15 shows an example of flow of processes upon start of the distribution process.

FIG. 15 shows an example of flow of processes performed upon start of the distribution process 25.

After the distribution process 25 is started (step S111), a wait state continues until the setting information 18A, 18B is received from the routine process thread 42 of the setting management process 23 (step S112).

Next, the number of image distribution threads 72 (72-1 to 72-r) specified in the setting information 18A, 18B are started (step S113).

The command-wait thread 71 starts waiting for an external command and performs setting modification and shut down according to the command (step S114).

Figure 16:
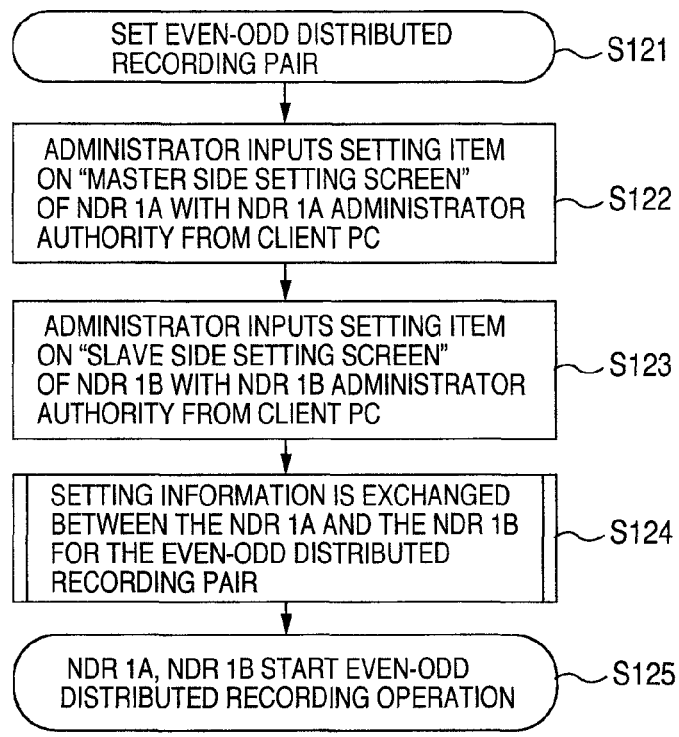
FIG. 16 shows an example of processes performed when setting an even-odd distributed recording method.

FIG. 16 shows an example of flow of processes performed when setting the even-odd distributed recording method.

It is assumed that two NDR (NDR 1A, NDR 1B) are set to perform the even-odd distributed recording (step S121).

Figure 17:
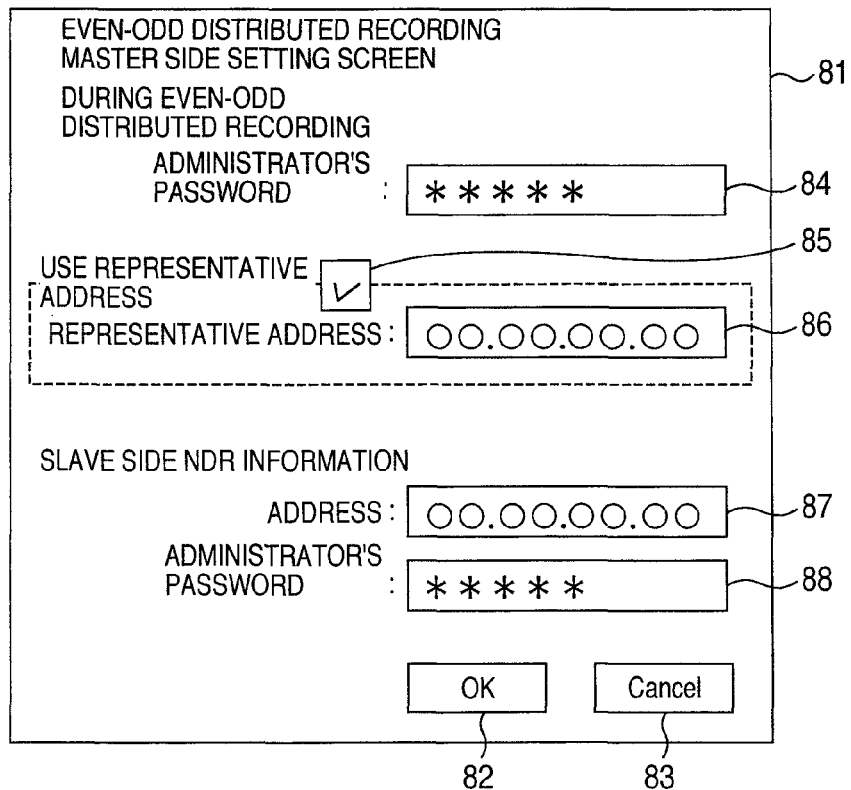
FIG. 17 shows an example of a master side setting screen of even-odd distributed recording.

Firstly, the administrator logs in to the NDR 1A from the client PC 4 (4-1 to 4-n) as the administrator with the administrator's authority of the NDR 1A to cause the NDR 1A to display "the even-odd distributed recording master side setting screen" 81 as show in FIG. 17 and inputs necessary setting items (step S122).

FIG. 17 shows an example of the even-odd distributed recording master side setting screen 81.

The "even-odd distributed recording master side setting screen" 81 has various elements 82 to 87.

An "OK button" 82 is used to shift to the next process upon completion of information input.

A "cancel button" 83 is used to cancel the information input and to return to a selection screen of the upper node.

An "administrator password input box during even-odd distributed recording" 84 is an input box for a password required when modifying the setting the two NDR 1A, 1B of the even-odd distributed recording operation. The input box is for a password used to access a setting screen concerning the even-odd distributed recording operation when virtually showing the two NDR 1A, 1B as one NDR. In this example, during the even-odd distributed recording operation, the two NDR operating are not viewed from outside but it is possible to show that virtually only one NDR is operating.

A "check box using representative address" 85 is a check box to specify whether to use a representative IP address in addition to the IP address unique to the NDR 1A and NDR 1B so as to virtually show that only one NDR is operating from outside during the even-odd distributed recording operation.

The "representative address" 86 can be inputted when the "check box using the representative address" 85 is checked and specifies the representative address in the even-odd distributed recording operation.

A "slave side NDR address input box" 87 as the slave side information is an input box for inputting the address of the partner NDR to constitute a pair for the even-odd distributed recording operation.

A "slave side NDR administrator password input box" 88 as the slave side NDR information is an input box for inputting the password of the administrator of the partner NDR constituting a pair for the even-odd distributed recording operation.

When the administrator inputs necessary information in "the even-odd distributed recording master side setting screen" 81 and presses the "OK button" 82, the setting management process 23A of the NDR 1A verifies the input value of the "even-odd distributed recording master side setting screen" 81. If an input error is detected, re-input is requested. If no input error is detected, a preparatory process for the even-odd distributed recording operation is performed.

In the preparatory process for the even-odd distributed recording operation, the setting management process 23A prepares information required for the even-odd distributed recording operation.

More specifically, it is assumed that the value of the "even-odd distributed recording password" 502 of the NDR 1A is a value inputted in the "administrator password input box during the even-odd distributed recording operation" 84; the value of the "pair NDR address" 505 is a value inputted in the "slave side NDR address input box" 87; and the value of the "pair NDR administrator password" 506 is a value inputted in the "slave side NDR administrator password input box" 88.

Moreover, when a check is present in the "check box using the representative address" 85, the value of the "representative address" 86 is stored in the representative IP address 514. When a check is absent, 0 (zero) is held as an invalid value.

Moreover, a new pair key value 504 is generated by using a time value or the like.

Moreover, the "even-odd distributed recording" flag 501 is set to "execution in progress" and the even-odd distributed recording operation is started in the master mode by using the camera information and the schedule information currently set in the NDR 1A.

Figure 18:
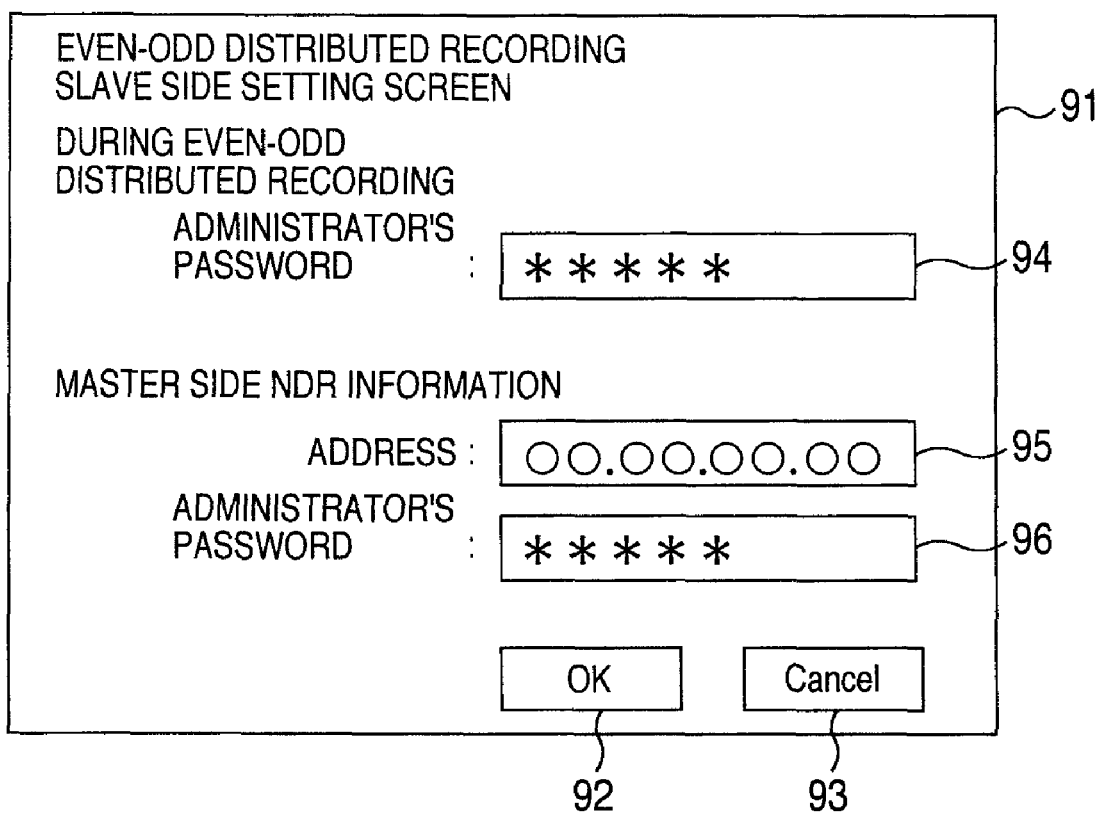
FIG. 18 shows an example of a slave side setting screen of even-odd distributed recording.

Next, the administrator logs in from the client PC 4 (4-1 to 4-n) to the NDR 1B as the administrator with the administrator authority of the NDR 1B so as to display the "even-odd distributed recording slave side setting screen" 91 as shown in FIG. 18 and inputs necessary setting items (step S123).

FIG. 18 shows an example of the even-odd distributed recording slave side setting screen.

The "even-odd distributed recording slave side setting screen" 91 has various elements 92 to 95.

An "OK button" 92 is a button for shifting to the next process upon completion of information input.

A "cancel button" 92 is a button to cancel the information input and return to the selection screen of the upper node.

A "administrator's password input box during even-odd distributed recording operation" 94 is an input box for a password used to access the setting screen concerning the even-odd distributed recording operation.

A "master side NDR address input box" 95 which is the master side NDR information is an input box for inputting the address of the partner NDR constituting a pair in the even-odd distributed recording operation.

A "master side NDR administrator password input box" 96 which is the master side NDR information is an input box for inputting the password of the administrator of the partner NDR constituting a pair in the even-odd distributed recording operation.

When the administrator inputs necessary items in the "even-odd distributed recording slave side setting screen" 91 and presses the "OK button" 92, the setting management process 23B of the NDR 1B verifies the input value of the "even-odd distributed recording slave side setting screen" 91. If an input error is detected, re-input is requested. If no input error is detected, a preparatory operation for the even-odd distributed recording operation is performed.

In the preparatory operation for the even-odd distributed recording operation, the setting management process 23B prepares information required for the even-odd distributed recording operation.

More specifically, it is assumed that the value of the "pair NDR address" 505 of the NDR 1B is a value inputted in the "master side NDR address input box" 95 and the value of the "pair NDR administrator's password" 506 is a value inputted in the "master side NDR administrator's password input box" 96.

The setting management process 23B of the NDR 1B accesses the NDR 1A and confirms that the NDR 1A is in the even-odd distributed recording operation state and the password accessed by the "administrator's password input box during even-odd distributed recording operation" 94 coincides with the even-odd distributed recording password 502 of the NDR 1A. Here, if communication with the NDR 1A is disabled, or if the NDR 1A is not operating in the even-odd distributed recording, or if the even-odd distributed recording password 502 of the NDR 1A does not coincide with the password value of the "administrator's password input box during even-odd distributed recording operation" 94, a corresponding message box is displayed to prompt a user to perform re-input in the "even-odd distributed recording slave side setting screen" 91.

Next, setting information is exchanged between the NDR 1A and the NDR 1B for the even-odd distributed recording pair (step S124).

More specifically, the setting management process 23B of the NDR 1B acquires information on the pair key value 504, the camera name 531, the camera type 532, the camera address 533, the camera administrator's password 534, and the schedule 535.

Moreover, the setting management process 23B of the NDR 1B sets the flag 501 indicating that the "even-odd distributed recording" of the NDR 1B is being executed to "execution in progress" and starts operation of the even-odd distributed recording in the slave mode.

Next, the NDR 1A and the NDR 1B start operation of the even-odd distributed recording (step S125).

Figure 19:
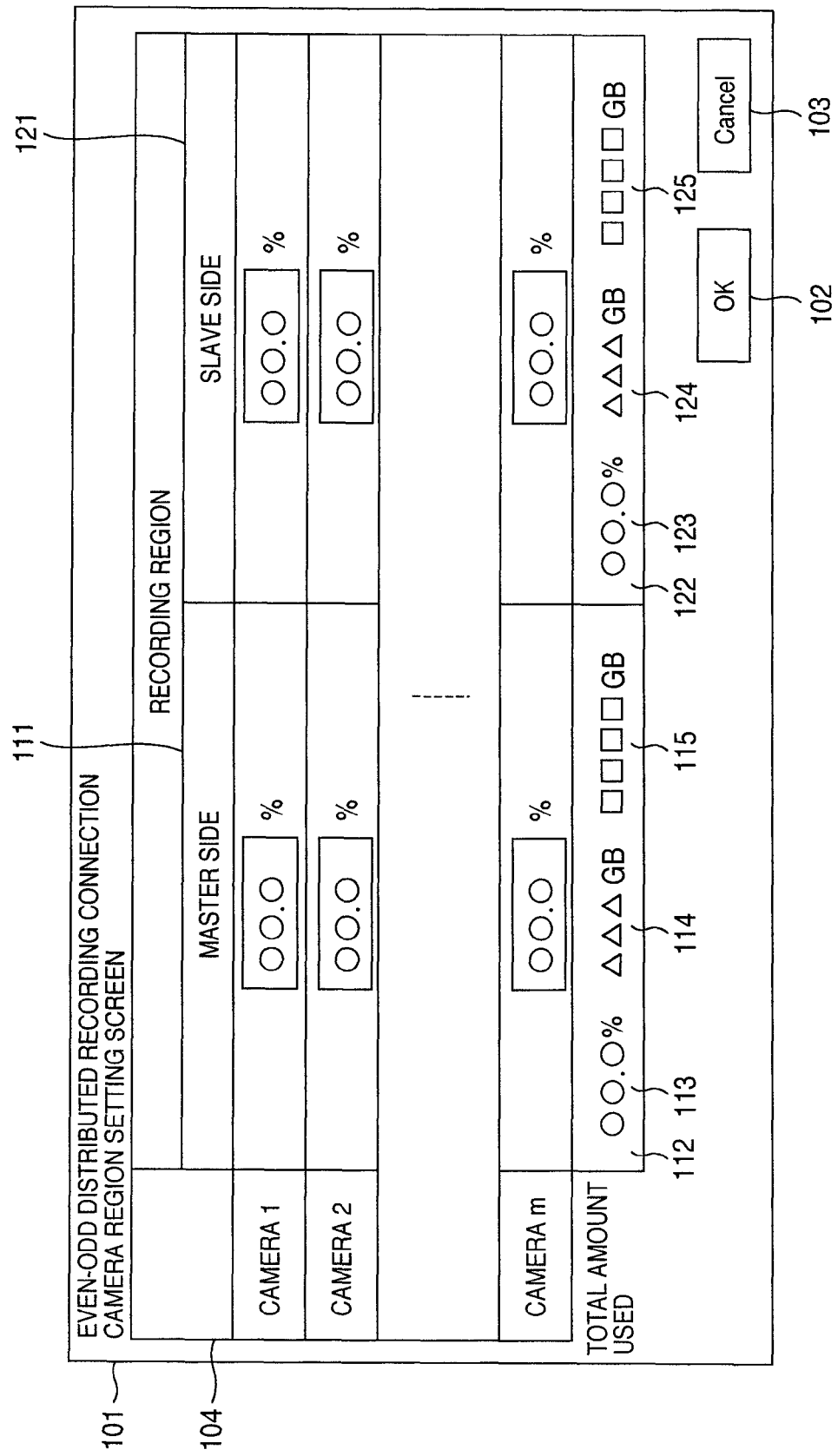
FIG. 19 shows an example of a connected camera region setting screen of even-odd distributed recording.
Figure 20:
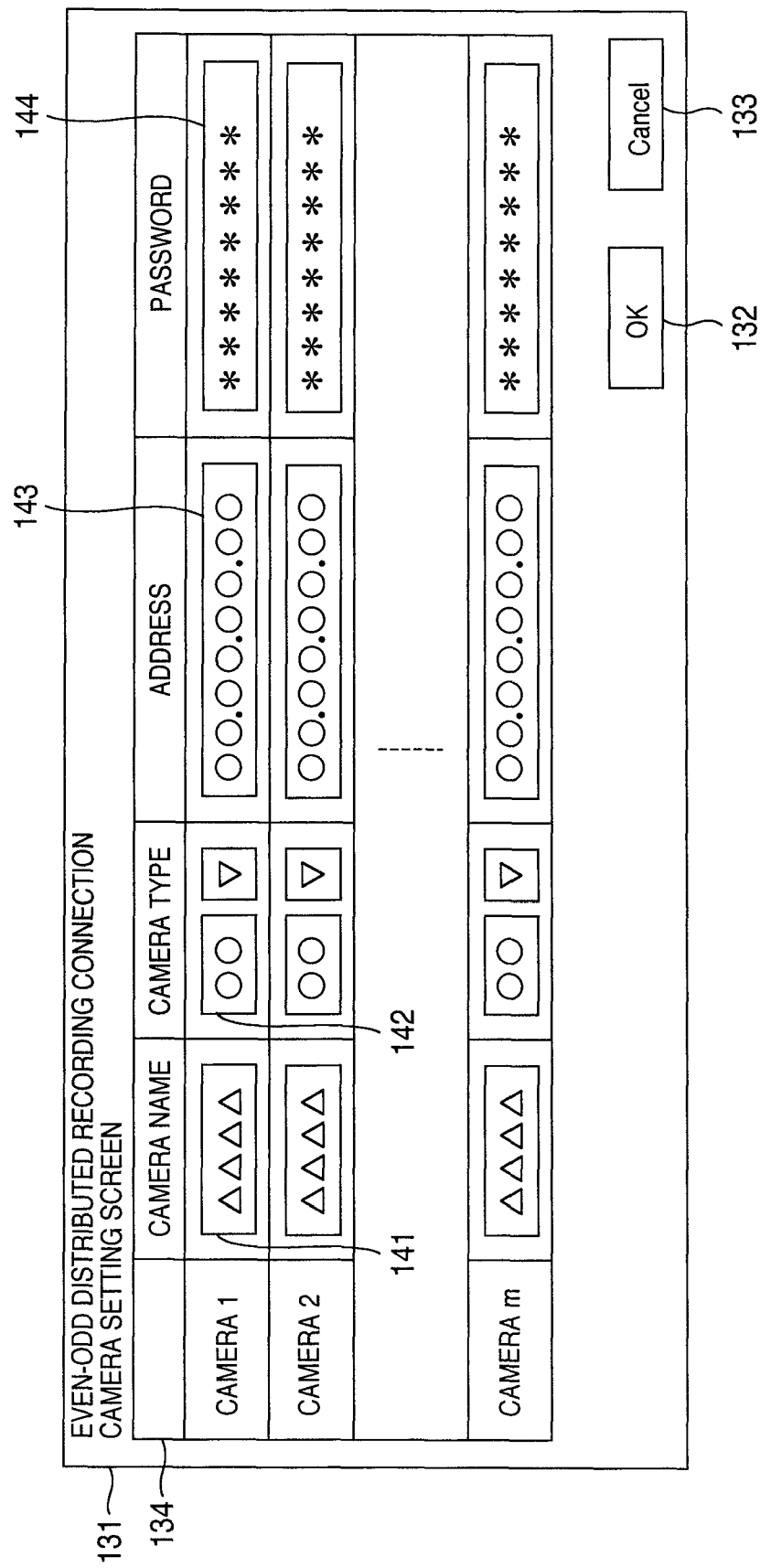
FIG. 20 shows an example of a connected camera setting screen of even-odd distributed recording.

When both of the NDR 1A and the NDR 1B are normally performing the even-odd distributed recording, the administrator accesses the NDR 1A or the NDR 1B or the representative IP address so as to select the setting screen of the even-odd distributed recording and inputs the even-odd distributed recording password so as to modify the setting concerning the even-odd distributed recording in the "even-odd distributed recording, connection camera region setting screen" 101 shown in FIG. 19, or in the "even-odd distributed recording, connection camera setting screen" 131 shown in FIG. 20, or in the "even-odd distributed recording, schedule setting screen" 151 shown in FIG. 21.

FIG. 19 shows an example of the "even-odd distributed recording, connection camera region setting screen" 101.

The "even-odd distributed recording, connection camera region setting screen" 101 is a screen used for modifying a recording region for each of the cameras performing image recording and has 7 main elements 102-104, 111, 112, 121, 122.

An "OK button" 102 is a button used to shift to the next process upon completion of information input.

A "cancel button" 103 is a button used to cancel the information input and return to the selection screen of the upper node.

A "camera number" 104 indicates the camera number in the table lateral column.

A "master side NDR camera recording region" 111 is an input box for modifying the value of the recording region of the camera corresponding to the master side NDR. In this example, the user inputs the amount to be allocated to the camera with respect to the total amount of the recording device (recording region) for image data which can be used in the master side NDR, in a percentage.

Moreover, a "master side NDR, camera recording region, total region used" 112 indicates the total value 113 of the "master side NDR camera recording region" 111 in a percentage, indicates the total value 114 of all the cameras in the camera regions in a byte size, and indicates the byte size 115 of the recording device for image data in the master side NDR.

A "slave side NDR camera recording region" 121 is an input box for modifying the value of the camera recording region corresponding to the slave side NDR. In this example, the user inputs an amount to be allocated for the corresponding camera with respect to the total amount of the image data recording device (recording region) which can be used in the slave side NDR, in a percentage.

Moreover, a "slave side NDR, camera recording region, total region used" 122 indicates the total value 123 of the "slave side NDR camera recording region" 121 in a percentage, indicates the total value 124 of all the cameras in the camera regions in a byte size, and indicates the byte size 125 of the recording device for image data in the slave side NDR.

In this example, a value of percentage is inputted in the "master side NDR camera recording region" 111 and the "slave side NDR camera recording region" 121. However, it is also possible to specify a value of the byte size or the like or the input may be switched between the percentage and the byte size.

When the "OK button" 102 is pressed, the master side NDR setting management process modifies the camera recording region. The setting management process 23 of the master side NDR modifies the master side camera recording region and, after completion of the modification of all the camera regions of the master side, modifies the slave side camera recording region.

Moreover, some of the storage processes 22 require stop of the storage processes 22 upon modification of the camera recording region. However, by successively modifying the camera recording regions between the master side and the slave side, it is possible to continuously record image data by the one not being modified and it is possible to modify the camera recording region without causing an image lack as a pair of the even-odd distributed recording.

FIG. 20 shows an example of the "even-odd distributed recording, connection camera setting screen" 131.

The "even-odd distributed recording, connection camera setting screen" 131 is a screen for modifying the setting of the IP camera to be connected and has seven main elements 132-134, 141-144.

The "even-odd distributed recording, connection camera setting screen" 131, performs setting information list display and modification for the information 531 to 534 for each of the cameras to be connected.

The "OK button" 132 is used to shift to the next process upon completion of the information input.

The "cancel button" 133 is used to cancel the information input and return to the selection screen of the upper node.

The "camera number" 134 indicates a camera number in the table lateral column.

The "camera name" 141 is an input box for displaying and modifying the camera name 531 of the per-camera information.

The "camera type selection menu box" 142 is a menu box for displaying and modifying the camera type 532 of the per-camera information. When a reversed triangle mark (∇) is pressed, a list of camera types which can be selected is displayed.

The "address" 143 is an input box for displaying and modifying the information on the address 533 of the per-camera information.

The "password" 144 is an input box for displaying and modifying a camera administrator's password 534 of the per-camera information.

When the "OK button" 132 is pressed, the setting management process 23 of the master side NDR updates the per-camera information for both of the master side and the slave side.

The reception process 24 of the master side NDR acquires image data from the IP camera 3 (3-1 to 3-m) by the modifies per-camera information 522. The slave side NDR holds the per-camera information 522 for the moment to shift to the degraded master mode.

FIG. 21 shows an example of the "even-odd distributed recording schedule setting screen" 151.

The "even-odd distributed recording schedule setting screen" 151 is used for modifying the setting of the schedule information for acquiring image data from the IP camera and has ten main elements 152 to 155, 161 to 166.

The "close button" 152 is a button for interrupting the information input and returning to the selection screen of the upper node.

The "camera selection menu box" 153 is a menu box for selecting a camera for which schedule is to be modified. When the reversed triangle mark (∇) is pressed, a list of camera numbers which can be selected is displayed for selection. When the selection of the camera number is modified, the camera number schedule display is modified to the one indicated by the "camera selection menu box" 153 for the "weekly schedule table" 154.

The "weekly schedule table" 154 is a table indicating a recording schedule in a week. The vertical axis indicates a time in a day and the horizontal axis indicates the day of the week. In the "weekly schedule table" 154, portions having no item display are the time bands when no recording is performed. For the time bands when recording is performed, the "schedule item" 155 is displayed.

The "schedule item" 155 indicates an item of recording schedule and describes the start time, the end time, and the frame rate of the image capture. When this "schedule item" 155 is clicked, the "even-odd distributed recording schedule item modification screen" 171 shown in FIG. 22 appears as a screen for modifying the contents of the schedule items.

The "schedule addition area" 161 is an input box group for adding a schedule item.

The "day-of-the-week specification menu box" 162 is a menu box used for specifying the day of the week of the added schedule item. When the reversed triangle mark (∇) is pressed, the time is displayed at 10-minute interval for 24 hours for performing selection.

The "start time specification menu box" 163 is a menu box for modifying the start time. When the reversed triangle mark (∇) is pressed, the time is displayed at 10-minute interval for 24 hours for performing selection.

The "end time specification menu box" 164 is a menu box for modifying the end time. By pressing the reversed triangle mark (∇), it is possible to display the time at 10-minute interval for 24 hours for performing selection.

The "capture frame rate specification menu box" 165 is a menu box used for specifying the frame rate of the image capture. When the reversed triangle mark (∇) is pressed, a list of frame rate values which can be selected is displayed for performing selection.

The "addition button" 166 is used as follows. When this button is pressed, if the start time 163 is later than the end time 164, an error message is displayed for prompting a re-input. Moreover, when the start time 163 is earlier than the end time 164, a schedule item is added with the value (day of the week, start time, end time, frame rate) of the "schedule addition area" 161.

It should be noted that when the schedule item 155 to be added has the same frame rate as the existing schedule item 155 adjacent to it, they become a continuous one schedule item.

Figure 22:
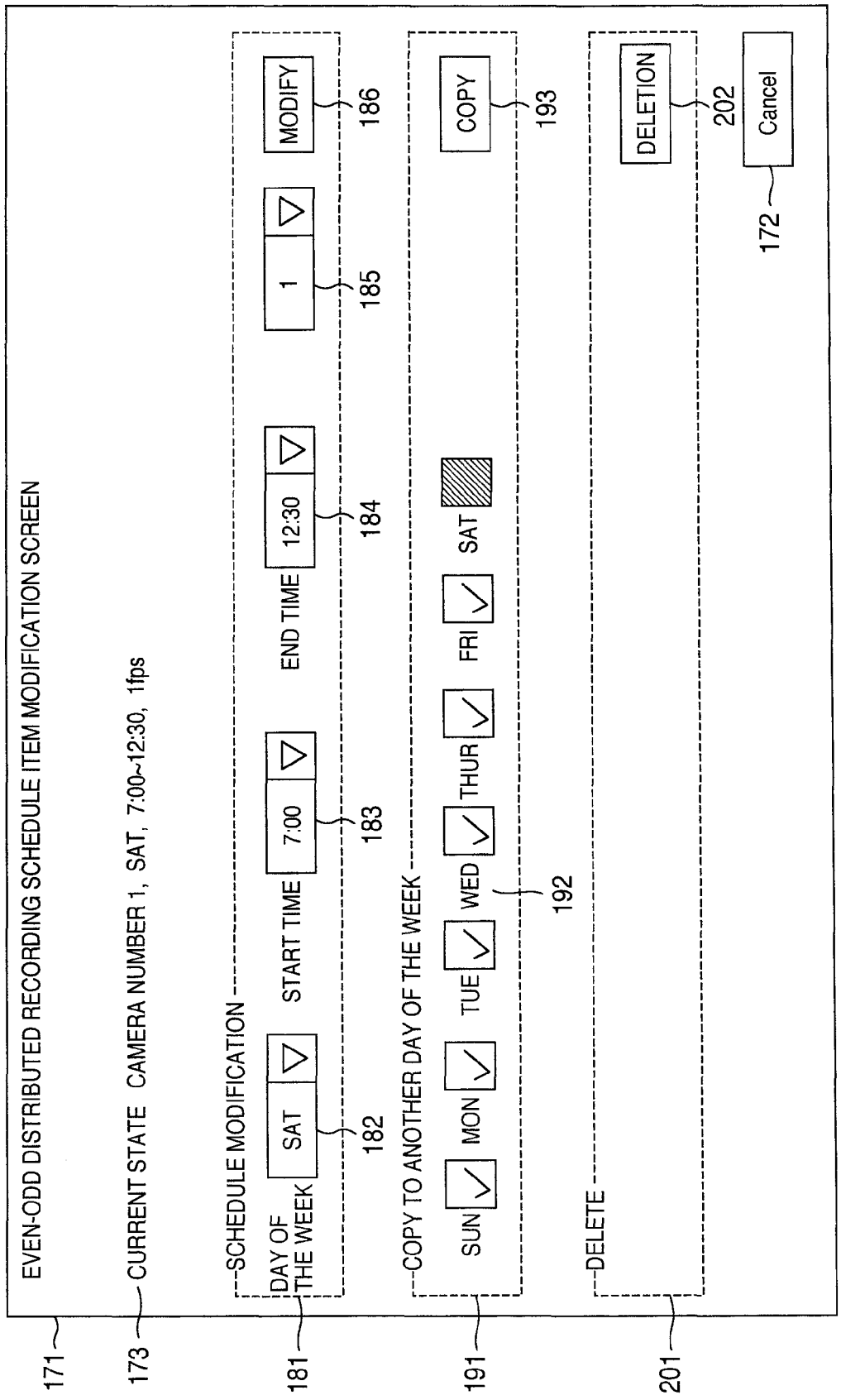
FIG. 22 shows an example of schedule item modification screen of even-odd distributed recording.

FIG. 22 shows an example of the "even-odd distributed recording schedule item modification screen" 171.

The "even-odd distributed recording schedule item modification screen" 171 is a screen which appears when the "schedule item" 155 shown in FIG. 21 is clicked and used for modifying the schedule item.

The "cancel button" 172 is used to interrupt the information input and return to the selection screen of the upper node.

The "current information area" 173 displays information on the "schedule item" 155 selected on the upper-node screen and displays the camera number, the day of the week, the start time, the end time, and the frame rate.

The "schedule modification area" 181 is an area of the input box group for modifying the contents of the schedule item.

The "day-of-the-week specification menu box" 182 is used for modifying the day of the weed of the schedule item. When the reversed triangle mark (∇) is pressed, a list of the days of the week is displayed.

The "start time specification menu box" 183 is a menu box for modifying the start time. When the reversed triangle mark (∇) is pressed, the time is displayed at 10-minute interval for 24 hours for performing selection.

The "end time specification menu box" 184 is a menu box for modifying the end time. By pressing the reversed triangle mark (∇), it is possible to display the time at 10-minute interval for 24 hours for performing selection.

The "capture frame rate specification menu box" 185 is a menu box for specifying the image capture frame rate. By pressing the reversed triangle ark (∇), it is possible to display a list of frame rate values which can be selected so as to perform selection.

The "modification button" 186 is used as follows. When this button is pressed and the start time 183 is later than the end time 184, an error message is displayed for prompting re-input. Moreover, when the start time 183 is earlier than the end time 184, the schedule item displayed in the "current information area" 173 is temporarily deleted (to set a state not performing recording) and then a schedule item is added with the value (day of the weed, start time, end time, frame rate) of the "schedule modification area" 181.

It should be noted that when the schedule item 155 to be added has the same frame rate as the existing schedule item 155 adjacent to it, they become a continuous one schedule item.

After the schedule item is added, control is returned to the "even-odd distributed recording schedule setting screen" 151 of the upper node screen.

The "schedule item copy area" 191 is an area of the input box group for copying the selected schedule item to another day of the week.

The "copy destination day-of-the-week specification check box group" 192 is a check box group for specifying the day of the week as the copy destination. Copy is performed to the day of the week having a check the day of the week identical to the one indicated in the current information area 173 cannot be selected.

The "copy button" 193 is used as follows. When this button is pressed a schedule item is added to the day of the week specified by the "copy destination day-of-the-week specification check box group" 192 with the values of the start time, the end time, and the frame rate in the "current information area" 173.

When the schedule item 155 to be added by using the "copy button" 193 has the same frame rate as the existing schedule item 155 adjacent to it, they become a continuous one schedule item.

After the schedule item is copied, control is returned to the "even-odd distributed recording schedule setting screen" 151 of the upper node screen.

The "delete area" 201 has a "delete button" 202 used for deleting a selected schedule item.

The "delete button" 202 functions as follows. When this button is pressed, the schedule item indicated in the "current information area" 173 is deleted so as to be a time band not performing recording.

After the schedule item is deleted, control is returned to the "even-odd distributed recording schedule setting screen" 151 of the upper-node screen.

In this example, in order to operate a single NDR 1A, 1B by terminating the operation in the even-odd distributed recording, the administrator logs in to the NDR 1A and NDR 1B from the client PC 4 (4-1 to 4-n) and executes "elimination of the even-odd distributed recording" in the respective setting screens.

The NDR 1A and 1B are temporarily shifted to the degraded master mode, discard information required for the even-odd distributed recording, turn OFF the flag 501 of the "even-odd distributed recording", and continues image data capture, storage, and distribution as a single body. In this example, recorded image data is held and the camera setting and the schedule information are handed over to continue operation as a single body.

In the aforementioned example, explanation has been given on a case of image data independent for each one frame such as the JPEG. Hereinafter, explanation will be given on an example of image data such as the MPEG handling a plurality of frames of image data at once in the even-odd distributed recording.

Figure 23:
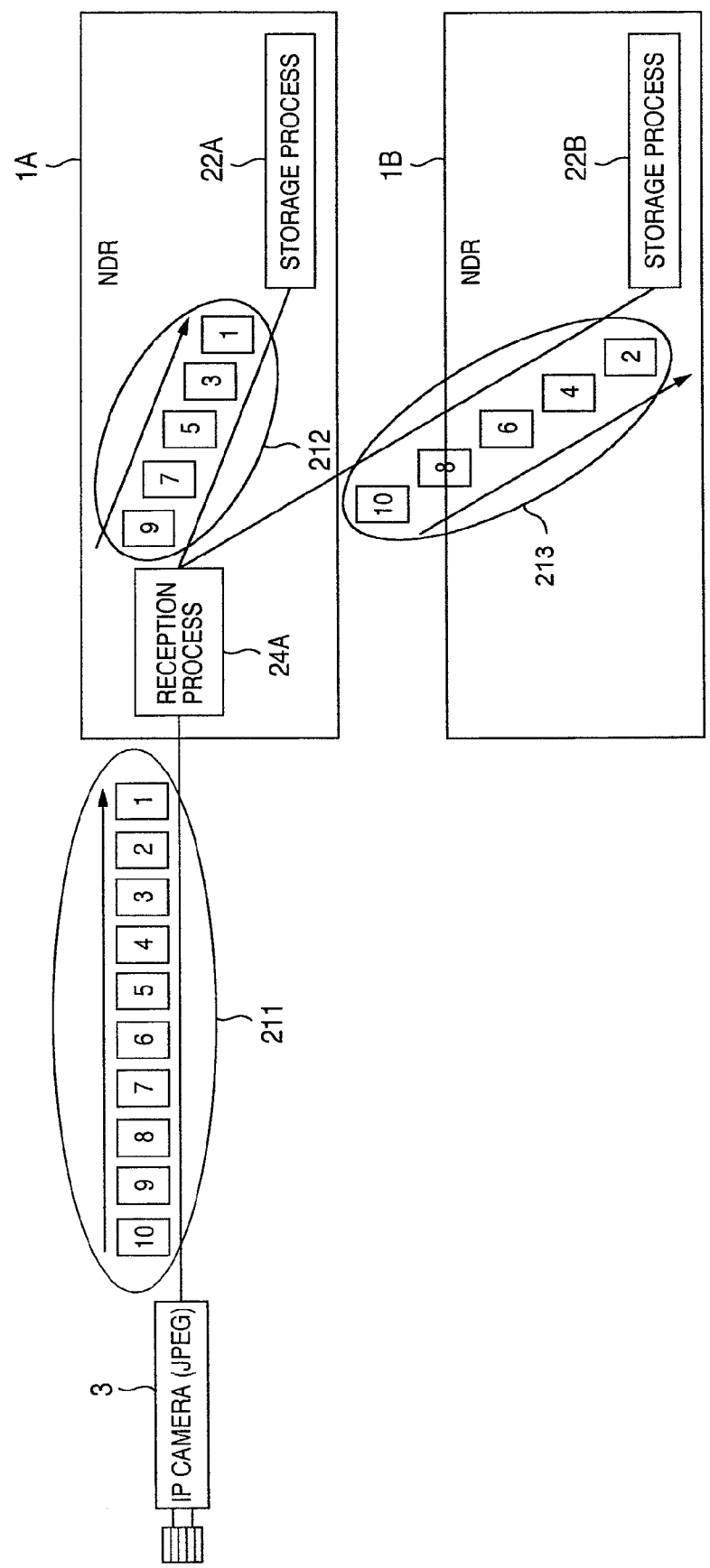
FIG. 23 shows an example of a routine state performing even-odd distributed recording of JPEG image data independent for each frame.

Firstly, FIG. 23 shows an example of a routine state performing the even-odd distributed recording of JPEG image data independent for each one frame.

Image data 211 is transmitted from the IP camera 3 to the reception process 24A of the NDR 1A for each one frame. The number in the image data 211 indicates the frame number.

The reception process 24A distributes the image data 211 for each one frame to the storage process 22A of the NDR 1A and the storage process 22B of the NDR 1B. When the frame number is an odd number, the data is transmitted as image data 212 to the storage process 22A. When the frame number is an even number, the data is transmitted as image data 213 to the storage process 22B. It should be noted that here, distribution is performed for each one frame. However, it is also possible to distribute each two frames or more to the two storage processes 22A, 22B.

When reproducing an image on the client PC 4 in the degraded operation, i.e., when one of the NDR has failed, it is impossible to read out an image from the NDR which has failed and image presence/absence is repeated for each one frame. That is, reproduction is performed with the frame rate lowered to half. However, even during degraded operation, for new image data 211 generated by the IP camera 3, both of the even-numbered frames and the odd-numbered frames are transmitted to the storage process 22 of the NDR normally operating.

In the method increasing the compression ratio by performing correlation in several to tens of frames in the temporal direction like MPEG-1/2/4, a plurality of frames of image data are handled as a set of image data. Here, the set is called GOV (Group of VOP (Video Object Plane).

For example, in the configuration shown in FIG. 23, it is possible to use a method for performing the even-odd distributed recording by handling one frame as a GOV. However, in this method, during the degraded operation when one of the NDR has failed, the client PC 4 can reproduce only the GOV recorded by the NDR normally operating. That is, a plurality of frames are reproduced and a plurality of frames are stopped, repetition of which results in an unnatural image reproduction.

Figure 24:
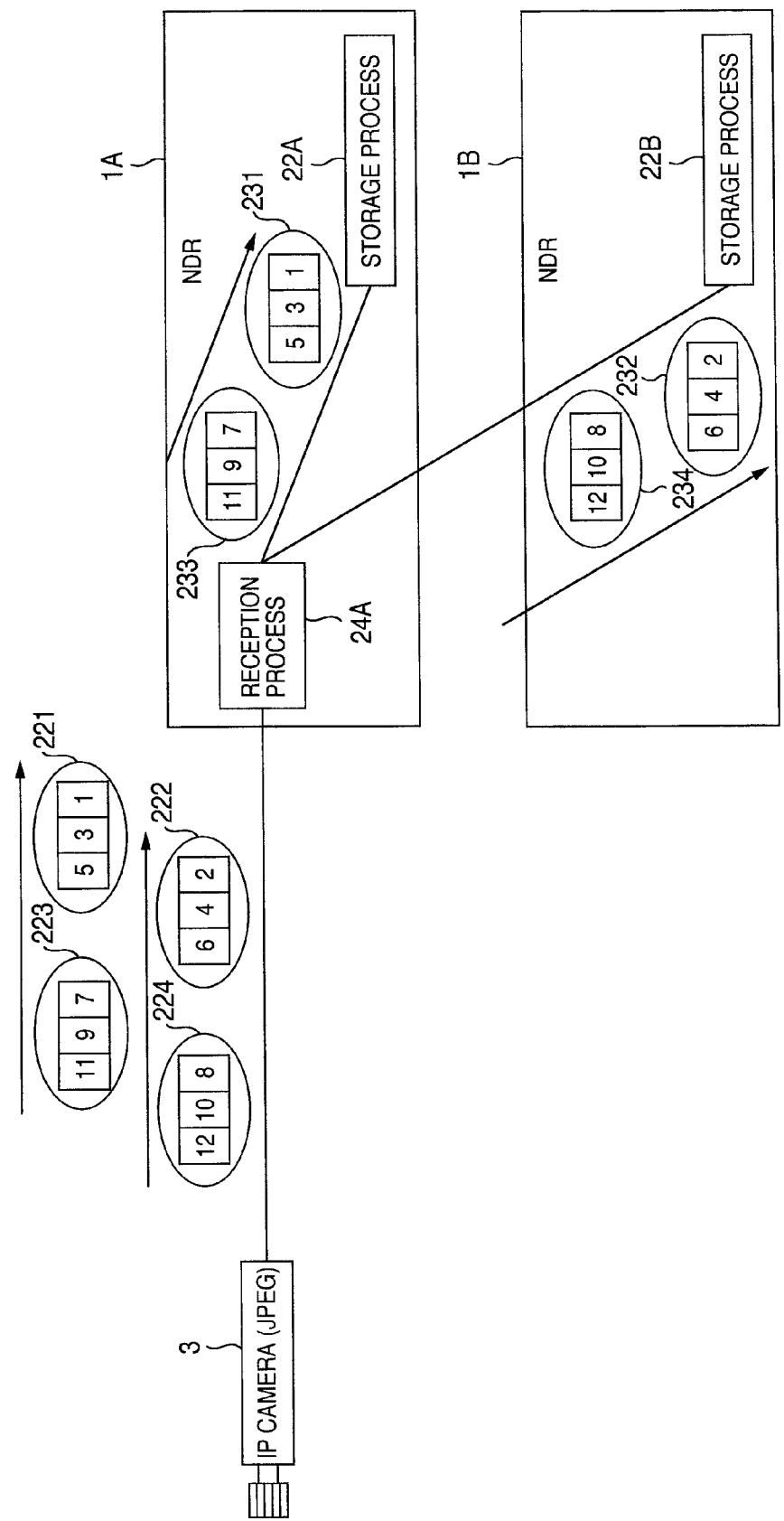
FIG. 24 shows an example of a routine state performing even-odd distributed recording of the MPEG image data.

To cope with this, FIG. 24 shows an example of the routine state performing even-odd distributed recording the MPEG image data.

Referring to FIG. 24, explanation will be given on a method for creating a GOV which can be reproduced at a lowered frame rate like the JPEG even during the degraded operation in the even-odd distributed recording of the MEPG image data.

The IP camera 3 outputs two types of MPEG image data. Here, the image type is called a stream.

One of the streams is image data obtained by encoding only odd-numbered frames while performing correlation in the temporal direction. The other stream is image data obtained by encoding only even-numbered frames while performing correlation in the temporal direction. Moreover, time information is attached to each frame of GOV.

Moreover, a stream of image data obtained by compressing the odd-numbered frames in temporal direction is called a stream-odd and a stream of image data obtained by compressing the even-numbered frames in temporal direction is called a stream-even.

The GOV of the stream-odd (GOV of the first, the third, and the fifth frame) 221 and the GOV (GOV of the seventh, the ninth, and the eleventh frame) 223 outputted from the IP camera 3 are transmitted as the GOV 231 and the GOV 233 via the reception process 24 to the storage process 22A of the NDR 1A and stored there.

Similarly, the GOV of the stream-even (GOV of the second, the fourth and the sixth frame) 222 and the GOV (GOV of the eighth, the tenth, and the twelfth frame) 224 outputted from the IP camera 3 are transmitted as the GOV 232 and the GOV 234 via the reception process 24 to the storage process 22B of the NDR 1B and stored there.

As for the image reproduction on the client PC 4, GOV is acquired from both of the NDR 1A and NDR 1B in the routine state. On the client PC 4, two streams of image data are decoded in parallel and they are sorted so as to be arranged in time series by using the frame time information of the image data for display. The stream-odd and the stream-even are alternately displayed in the time series.

In the degraded operation when one of the NDR has failed, only the stream-odd or the stream-even is reproduced. As compared to the routine state, reproduction can be performed by repeating presence/absence of the image data for each one frame, i.e., in the state of the frame rate lowered to half.

As has been described above, in the image storage system of the present embodiment, image data from one camera (IP camera in this embodiment) is recorded in frame unit alternately in the two image storage device (NDR in this embodiment) 1A, 1B.

Moreover, in this embodiment, when one of the image storage devices has failed, the other image storage device records all the frames of image data from the camera 3.

Moreover, in this embodiment, frames are sorted in one of the image storage devices so that image data is outputted in the time series to the client or the monitor.

Moreover, in this embodiment, as has been explained with reference to FIG. 24, it is possible to perform effective even-odd distributed recording even when MPEG is used.

In this embodiment, explanation has been given on the configuration using two NDR. However, for example, it is also possible to realize the even-odd distributed recording by providing two hard discs on one NDR.

Moreover, the camera 3 may be replaced by a WEB encoder or the like.

It should be noted that in the image storage system of the present embodiment, the image capture device includes the IP camera 3 (3-1 to 3-m) and a plurality of NDR 1A, 1B constitute a plurality of image storage devices.

Moreover, in the image storage devices of the present embodiment (NDR 1A, 1B), the storage unit includes the function that the storage processes 22A, 22B store image data in the recording devices 11A, 11B; the image reception unit includes the function that the reception processes 24A, 24B receives image data from the image capture device (IP camera 3) via the network I/F 14A, 14B and the network 2; the check unit includes the function for checking the operation state of the other image storage device (NDR 1A, 1B) constituting a pair by the heartbeat communication; and the image output unit includes the function that the distribution processes 25A, 25B transmit image data to the client PC 4 (4-1 to 4-n) via the network I/F 14A, 14B and the network 2.

Moreover, in this embodiment, the image capture device (IP camera 3) includes a compression unit for compressing the image data by the JPEG or the MPEG.

The configurations of the system and the devices concerning the present invention are not to be limited to the aforementioned ones but various configurations may be used. Moreover, the present invention may be provided as a method or a technique for executing the processes concerning the present invention, a program for realizing the method or the technique, a recording medium for recording the program, or various systems and devices.

Moreover, the present invention may be applied to various fields other than the one shown above.

Moreover, configuration of various processes performed in the system and devices of the present invention may be, for example, such that in hardware resources having a processor and a memory, control is performed by the processor executing a control program stored in a ROM (Read Only Memory). Moreover, for example, each of the function units for executing the processes may be configured as an independent hardware circuit.

Moreover, the present invention may also be understood as a computer-readable recording medium such as a floppy (registered trade mark) disc and a CD (Compact Disc)-ROM containing the control program or the program itself. By inputting the control program from the recording medium into a computer so as to cause a processor to execute the program, it is possible to perform the processes concerning the present invention.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A video storage system comprising:
a plurality of video storage devices for recording video data captured by a video capture device, the video data being in the form of a plurality of frames,
wherein each of the video storage devices includes a recording unit for recording video data and a check unit for checking whether another video storage device is operating normally,
wherein two of the plurality of video storage devices are paired and check each other using their check units and one of the paired video storage devices serves as a master video storage device, and the other of the paired video storage devices serves as a slave video storage device, and the master video storage device includes a video reception unit configured with software for receiving the video data captured by the video capture device;
wherein the video reception unit, when a check result obtained by a check unit indicates that the master video storage device is operating normally, distributes the received plurality of frames to the paired video storage devices, the frames being divided, after being received by the video reception unit, into alternative sequences of frames for distribution, one of the alternative sequences including odd-numbered frames, and another of the alternative sequences including even-numbered frames, the distribution being such that the odd-numbered frames are distributed to one of the paired video storage devices, and the even-numbered frames are distributed to the other of the paired video storage device;
wherein each of the paired video storage devices operates according to a mode based on the check result obtained by the check unit and the slave video storage device goes into a degraded master mode in which the slave video storage device operates as a master video storage device starting a reception process of software for configuring a video reception unit and recording both of odd-numbered frames and even-numbered frames into the recording unit and using a representative Internet Protocol (IP) address previously used by the master video storage device, if the check result obtained by the check unit indicates that the master video storage device has stopped operating normally.

2. The video storage system as claimed in claim 1, wherein the master and the slave video storage devices execute a setting management process including a command-wait thread and a routine process thread, the command-wait thread obtains the check result from the check unit and instructions from the administrator, and the routine process thread changes the operation mode of the slave video storage device to the degraded master mode.

3. The video storage system as claimed in claim 2, wherein the master video storage device includes a video output unit for acquiring the video data recorded in the storage unit provided in each of the paired video storage devices and arranging the recorded frames in the order in which they were received by the video receiving unit for output.

4. The video storage system as claimed in claim 3, wherein the system includes a video capture device having a compression unit for compressing a captured video data set including a predetermined number of odd numbered frames and a captured video data set including a predetermined number of even numbered frames, and
wherein both of the paired video storage devices record the compressed video data set of odd and even numbered frames respectively as a unit.

5. The video storage system as claimed in claim 1, wherein the master video storage device includes an image output unit for acquiring the video data recorded in the storage unit provided in each of the paired video storage devices and arranging the stored frames in the order in which they were received by the video receiving unit for output.

6. The video storage system as claimed in claim 5, wherein the system includes a video capture device having a compression unit for compressing a captured video data set including a predetermined number of odd-numbered frames and a captured video data set including a predetermined number of even-numbered frames, and
wherein both of the paired video storage devices record the compressed video data sets of odd and even-numbered frames respectively as a unit.

7. The video storage system according to claim 1, wherein a setting management process of the master video storage device periodically compares a start time of the slave video storage device, and
wherein if the start time of the slave video storage device is older than the start time of the master video storage device then the master video storage device goes into a mode in which it operates as slave.

8. The video storage system as claimed in claim 1, wherein said video capture device is an Internet Protocol (IP) camera, the paired video storage devices are configured to distribute the frames and record the data and have the representative IP address for virtually representing the paired video storage devices as one video storage device from outside, the representative IP address being different from IP addresses of the paired video storage devices, wherein the master video storage device uses the representative IP address and activate, as a process, software operated by a processor included in the master video storage device to activate the video reception unit, the activated video reception unit distributes the video captured from said IP camera to an alternative one of the recording unit of the master video storage device and the recording unit of another video storage device which is not the master video storage device in the form of the frames for distribution, and wherein, if the check unit receives no response from the master video storage device after the check unit sends a heart beat notification to the master video storage device, another video storage device is changed into the master video storage device by activating the software and the changed master video storage device records all of the video data which are received after the another video storage device is changed into the master video storage device.

9. The video storage system according to the new claim 8, wherein the one of the paired video storage devices has a flag, an address and a key value, wherein the flag indicates whether or not a process on an even-odd distributed recording method is executed, the even-odd distributed recording method is configured to distribute the video data captured from said camera to alternative one of the recording unit of the master video storage device and the recording unit of another video storage device which is not the master video storage device in the form of the frames, wherein the address indicates an address of a destination video storage device of the video storage devices configured to be paired in the even-odd distributed recording method, wherein the key value indicates information for confirming the video storage devices configured to be paired in the even-odd distributed recording method and is used for searching for the destination video storage device, and wherein the system executes the steps of:

holding a present time as a booting time of the system, checking the flag, executing another process on another processing recording method other than the even-odd distributed recording method if the process on the even-odd distributed recording method is not being executed, and checking whether or not the destination video storage device is active by attempting to communicate to the address of the destination video storage device if the process on the even-odd distributed recording method is being executed, wherein, if the destination video storage device is not active, the process on the even-odd distributed recording method is executed by the one of the paired video storage devices as a master mode for activating as the master video storage device, wherein, if the destination video storage device is active, an inquiry whether or not the destination video storage device is executing the even-odd distributed recording method is sent wherein if a notification that the destination video storage device is not executing the process on the even-odd distributed recording method is received in response to the inquiry, the process on the even-odd distributed recording method is executed by the one of the paired video storage devices as the master mode, wherein if the notification that the destination video storage device is executing the process on the even-odd distributed recording method is received in response to the inquiry, a further inquiry whether or not the key value of the one of the paired video storage devices is matched with a key value of the destination video storage device is sent to the destination video storage device, wherein if a result indicating that the key value of the destination video storage device is not matched with is received, the master video storage device executes the process on the even-odd distributed recording method, wherein if a result indicating that the key value of the destination video storage device is matched with is received, a booting time of the destination video storage device is inquired to the destination video storage device and, in response to the inquiry, is compared with the booting time of the one of the paired video storage devices, wherein if the booting time of the one of the paired video storage devices is earlier than the booting time of the destination video storage device, the one of the paired video storage devices executes the process on the even-odd distributed recording method as the master mode, and wherein if the booting time of the one of the paired video storage devices is later than the booting time of the destination video storage device, the one of the paired video storage devices executes the process on the even-odd distributed recording method as a slave mode for activating as the slave video storage device, wherein, via the check unit, the one of the paired video storage devices which is executing the process on the even-odd distributed recording method as the master mode sends the heart beat notification to the destination video storage device and, in response to the heart beat notification, the booting time of the destination storage device is compared with the booting time of the one of the paired video storage devices, and wherein if the booting time of the destination video storage device is earlier than the booting time of the one of the paired video storage devices, the master video storage device is stopped to use the representative IP address and the one of the paired video storage devices is transited to the slave mode.

* * * * *